(12) United States Patent
Yokomitsu et al.

(10) Patent No.: US 7,860,162 B2
(45) Date of Patent: Dec. 28, 2010

(54) OBJECT TRACKING METHOD AND OBJECT TRACKING APPARATUS

(75) Inventors: Sumio Yokomitsu, Yokohama (JP);
Yajun Fang, Cambridge, MA (US);
Ichiro Masaki, Boxborough, MA (US);
Berthold K. P. Horn, Intervale, NH (US)

(73) Assignee: Panasonic Corporation, Osaka (JP)

( * ) Notice: Subject to any disclaimer, the term of this patent is extended or adjusted under 35 U.S.C. 154(b) by 1490 days.

(21) Appl. No.: 11/239,551

(22) Filed: Sep. 29, 2005

(65) Prior Publication Data

US 2007/0070201 A1    Mar. 29, 2007

(51) Int. Cl.
*H04N 7/12* (2006.01)
*H04N 5/14* (2006.01)
(52) U.S. Cl. .................. 375/240.12; 375/240.16; 348/699; 348/700
(58) Field of Classification Search ............ 375/240.12, 375/240.16; 382/236, 103, 104; 348/699, 348/700
See application file for complete search history.

(56) References Cited

U.S. PATENT DOCUMENTS

2006/0140447 A1*  6/2006  Park et al. ............... 382/104

FOREIGN PATENT DOCUMENTS

JP      2005-141687     6/2005

OTHER PUBLICATIONS

Haritaoglu et al., W[4]: Real-Time Surveillance of People and Their Activities, IEEE Transactions of Pattern Analysis and Machine Intelligence, vol. 22, No. 8, Aug. 2000, pp. 809-830.
Zhao et al., "Segmentation and Tracking of Multiple Humans in Complex Situations", University of Southern California Institute for Robotics and Intelligent Systems, 2001, vol. 2, pp. 194-201.
Zang et al; "Object Classification and tracking in Video Surveillance", CITR Technical Reports, [Online] No. 128, 2003, pp. 1-8, URL: http://www.citr.auckland.ac.nz/techreports/show. php?id=128>[retrieved on Sep. 15, 2006].
Loutas et al; "Occlusion Resistant Object Tracking", Proceedings 2001 International Conference on Image Processing. ICIP 2001. International Conference on Image Processing, NY, IEEE, US, vol. 1 of 3. Conf. 8 Oct. 7, 2001 pp. 65-68, XP010563698 ISBN: 0-7803-6725-1.
International Search Report dated Sep. 28, 2006.

* cited by examiner

*Primary Examiner*—Houshang Safaipour
(74) *Attorney, Agent, or Firm*—Pearne & Gordon LLP

(57) ABSTRACT

An object tracking apparatus includes a buffer unit that is configured to store picture information, an object position detecting unit that detects positional information of an object from the picture information, an object region detecting unit that detects a region of the object in the picture information based on the positional information, a storage unit that detects a feature properties of the object located in the region and stores the positional information, the feature properties and the region of the object, a predicting unit that predicts a position of the object of the next frame in the picture information from the position information, a determining unit that determines a predictive area of the next frame where the region is to be moved based on the position of the object of the next frame, and a verifying unit that verifies the feature properties of the object within the predictive area of the next frame and outputs a most resemble region.

14 Claims, 21 Drawing Sheets

REGIONAL INFORMATION

FIG. 14

| 181 | 182 | 183 | 184 | 185 | 186 | 187 |
|---|---|---|---|---|---|---|
| ADDRESS | OBJECT NUMBER | INPUT SOURCE | TIME | POSITION | REGION | FEATURE PROPERTIES INFORMATION |
| 0001 | OBJECT 01 | INPUT 02 | 8:35:30 | (110, 120) | (20, 40) | STORAGE NUMBER 01 |
| 0002 | OBJECT 01 | INPUT 02 | 8:36:35 | (120, 110) | (23, 42) | STORAGE NUMBER 02 |
| 0003 | OBJECT 01 | INPUT 02 | 8:36:50 | (130, 115) | (21, 41) | STORAGE NUMBER 03 |
| ... | | | | | | |
| 000n | OBJECT 01 | INPUT 02 | 8:47:50 | (170, 130) | (25, 48) | STORAGE NUMBER n |

FIG. 15
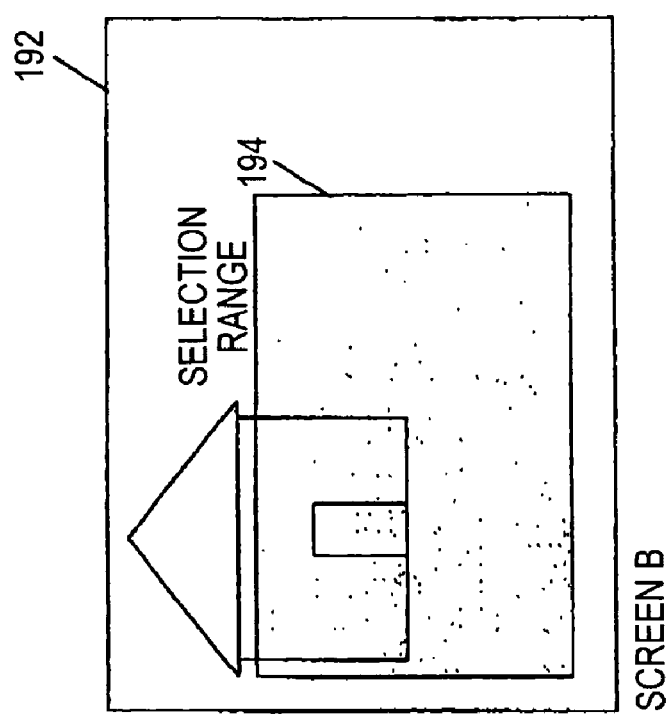
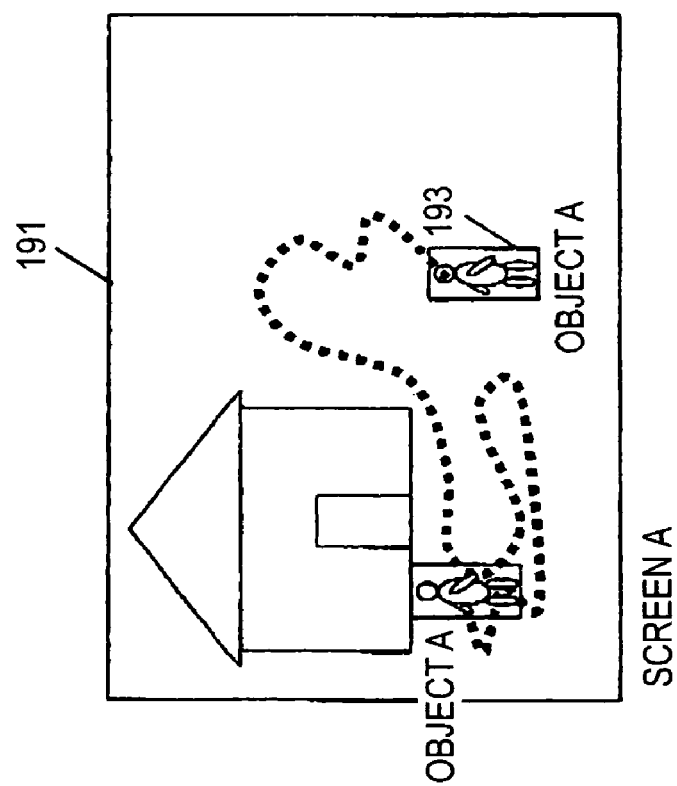

FIG. 21
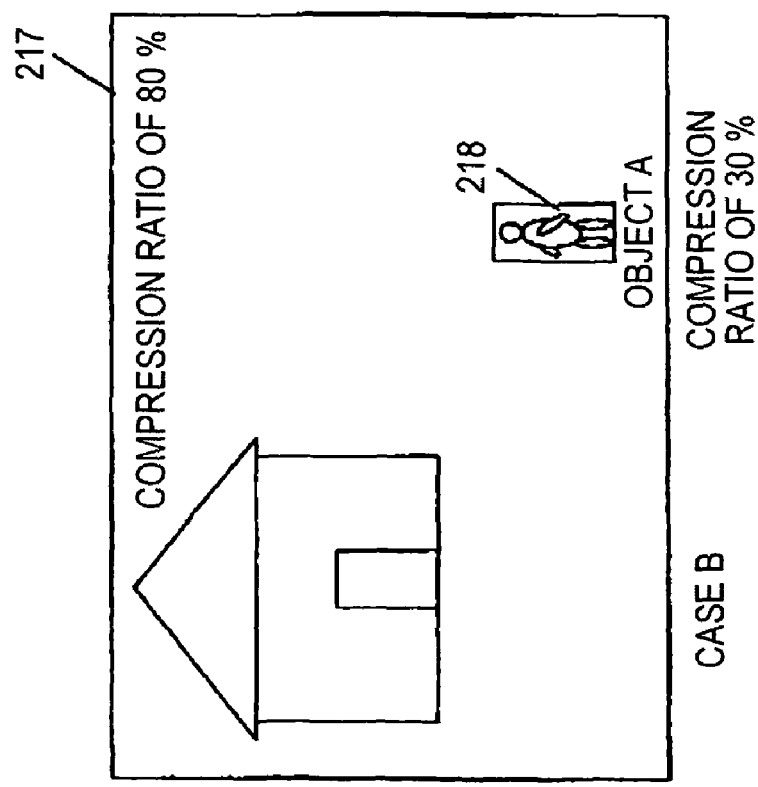
CASE A — HIGH COMPRESSION RATIO AND LOW IMAGE QUALITY / LOW COMPRESSION RATIO AND HIGH IMAGE QUALITY
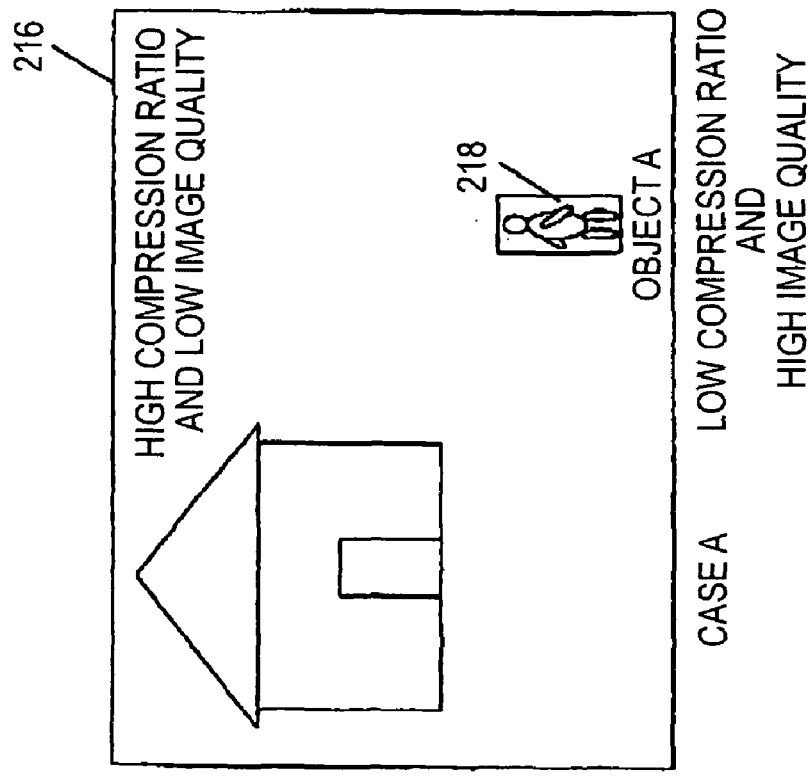
CASE B — COMPRESSION RATIO OF 80 % / COMPRESSION RATIO OF 30 %

OBJECT TRACKING METHOD AND OBJECT TRACKING APPARATUS

BACKGROUND OF THE INVENTION

The present invention relates to an object tracking technique capable of tracking an object in a stable manner even when the images of respective objects such as persons and vehicles intersect with one another, are hidden by one another, or even in the case that there is adverse influence of external disturbance such as noise received by the imaging apparatus due, for example, to environmental changes.

As for related object tracking techniques, there is one method for tracking an object as follows: Templates such as texture patterns of respective objects are previously stored, and a search operation is carried out within an image frame using these templates; the region within the image frame that resembles the template most is considered to be the position to which an object has moved within the image frame; this operation is repeatedly carried out with respect to a stream of input frames so as to track the relevant object. Also, there is another object tracking method (refer to in non-patent publication 1). That is, even in the case that a plurality of objects appear in the image and the images of respective objects intersect one another, a template matching operation is carried out based upon templates which correspond to the respective objects; the objects are tracked in a continuous manner before the images of plural objects intersect one another, and also after the images of plural objects intersect with one another.

Also, when tracking objects, one may use a dynamic filter, for instance, a method for tracking an object may employ a Kalman filter (refer to non-patent publication 2).

Further, when tracking an object, one may use a weighting coefficient (refer to patent publication 1). That is, in the case that a dynamic filter, or the like is employed, a weighting coefficient is applied with respect to past input values, such that an object can be tracked while suppressing the adverse influence caused by external disturbances such as noise, observation noise.

[Non-Patent Publication 1]

$W^4$: real-time surveillance of people and their activities Haritaoglu, I.; Harwood, D.; Davis, L. S.; Pattern Analysis and Machine Intelligence, IEEE Transactions on Volume 22, Issue 8, August 2000, Page(s): 809-830

[Non-Patent Publication 2]

Segmentation and tracking of multiple humans in complex situations Tao Zhao; Nevatia, R.; Fengjun Lv; Computer Vision and Pattern Recognition, 2001, CVPR 2001. Proceedings of the 2001 IEEE Computer Society Conference on Volume 2, 2001, Page(s): 11-194-11-201 vol.2

[patent publication 1]

Japanese Laid-open Patent Application No. 2005-141687 (FIG. 1)

MEANS FOR SOLVING PROBLEM BY THE INVENTION

However, related object tracking methods may have the following problems. When a template matching operation is carried out with respect to each of the image frames by using templates of objects in an object tracking method, when only one object is present in the image, then the object can be tracked in a stable manner. However, if a portion of the object is hidden due to the adverse influence caused by obscuration, or the like, it is difficult in practice to make the image of this object match the previously held templates. Thus, there is the possibility that the matching using the templates cannot be carried out reliably. In the case that a plurality of objects appear and the images of these plural objects intersect one another, when the intersected portion of the images of these objects is small, the object tracking operation may still be properly carried out by executing the templates matching operations of the respective objects. However, if the images of the objects overlap with each other in a large region, then it is difficult in practice to match the templates reliably.

Also, methods for tracking objects using Kalman filtering, are sensitive to excessive noise. In the case that noise becomes excessively large, an output value does not constitute the correct value. Because of the dynamics of the filter, if an erroneous input value is once entered, the adverse influence of this erroneous value will propagate to succeeding tracking operations. As a result, there is the possibility that an object cannot be tracked properly, Also, if a dynamic filter is used with a method for adjusting the weight coefficient with respect to the past input value so as to reduce the adverse influence of noise, then this has the following problem: Since the weight coefficient is applied to the past input value, the adverse influence caused by the input value containing the specific noise may be reduced. However, it is difficult in practice to develop an algorithm that will determine what weight coefficient should be applied in each case. When a fixed weight coefficient is applied to past input values, an input value obtained by smoothing the past input values may be utilized. However, then, if the noise is large, there remains the problem that this adverse influence cannot be avoided.

SUMMARY OF THE INVENTION

The present invention has been made to solve the above-explained problems, and therefore, has an object to provide an object tracking method and an object tracking apparatus, capable of tracking images of objects, such as persons and vehicles, in a stable manner in scene conditions where the images of these objects may intersect one another, and/or these objects may be temporarily hidden, or may be subject to adverse influences caused by external disturbance such as noise and environmental changes.

In order to achieve the above object, according to the present invention, there is provided an object tracking method, comprising:

storing a picture information;

detecting positional information of an object from the picture information;

detecting a region of the object in the picture information based on the positional information;

detecting a feature properties of the object located in the region;

storing the positional information, the feature properties, and the region of the object;

predicting a position of the object of a next frame in the picture information from the position information;

determining a predictive area of the next frame where the region is to be moved based on the predicted position of the object of the next frame; and verifying the feature properties of the object within the predictive area of the next frame; and outputting as an object region, a region of the predictive area that resembles the feature properties most based on the verified result in the verifying process.

Preferably, the predicting process includes:

predicting a first position of the object of the next frame based on the positional information;

predicting a second position of the object of the next frame based on a position of the object of the previous frame;

selecting one of the predicted first position of the object of the next frame and the predicted second position of the object of the next frame; and outputting the predicted position of the object of the next frame selected in the selecting process.

According to the present invention, there is also provided an object tracking apparatus, comprising:

a buffer unit that is configured to store a picture information;

an object position detecting unit that detects positional information of an object from the picture information;

an object region detecting unit that detects a region of the object in the picture information based on the positional information;

a storage unit that detects a feature properties of the object located in the region, and stores the positional information, the feature properties of the object, and the region of the object;

a predicting unit that predicts a position of the object of a next frame in the picture information from the position information;

a determining unit that determines a predictive area of the next frame where the object is to be moved based on the predicted position of the object of the next frame; and a verifying unit that verifies the feature properties of the object with the predictive area of the next frame and outputs as an object region, a region of the predictive area that resembles the feature properties most based on the verified result.

Preferably, a predicting unit includes:

a first predicting unit that predicts a first position of the object of the next frame based on the positional information;

a second predicting unit that predicts a second position of the object of the next frame based on a position of the object of the previous frame; and a predicted information switching unit that selects one of the predicted first position of the object of the next frame and the predicted second position of the object of the next frame to output the selected predicted position of the object of the next frame in accordance with a setting value.

In the above the arrangement and the method, even in such a case that noise is superimposed on the positional information of the object which is acquired from the present picture frame, an adverse influence caused by the noise can be avoided.

Preferably, both the predicting process of the first position and the predicting process of the second position are performed by constituting a dynamic prediction model.

In the above method, while a single prediction coefficient is not employed, an optimum prediction model can be constituted in response to a variation of observation values which are inputted, and positional information of the next frame can be predicted based upon the constituted prediction model.

Preferably, the object tracking method, further comprises:

determining the predicted position of the objects, wherein the predicted first position of the object of the next frame and the predicted second position of the object of the next frame are selected based on a setting value in the selecting process; and wherein the setting value is determined based on the status of the objects.

In the above method, even in such a case that an object is hidden and objects intersect with one another, an object can be additionally provided.

Preferably, the object tracking method further comprises:

applying weight values to the positional information in the past, wherein the positional information with the weight values are used in the predicting process.

In the above method, while the prediction is not carried out based upon the single value, a series of the past input positional information is employed, and further, the weighting coefficients are employed with respect to each of the past input positional information. Since the values obtained by applying the weighting coefficients to the respective input positional information are used as the input values, such a prediction can be carried out while an adverse influence of a value on which specific noise is superimposed is reduced.

The object tracking method further comprises:

determining whether the feature properties of the object in a storage unit is updated based on a result of the status of the objects in the determining process.

In the above method, feature properties corresponding to the reliability of the statuses of the respective objects can be updated. In other words, in such a case that the feature properties of the object cannot be correctly extracted due to the obscuration, the concealing article, and the environmental change, such a condition that the feature properties extracted in the present frame is not registered is set with respect to the feature properties storage unit.

As a result, the feature properties data having the low reliability can be excluded. Also, even in such a case that the plural objects are overlapped by one another, or are intersected with one another, and similarly, in the case that the correct feature properties cannot be extracted, such a condition that the extracted feature properties is not registered is set. As a result, registration of the feature properties data having the low reliability can be excluded, and the erroneous operations can be reduced.

According to the present invention, there is also provided an object tracking method, comprising:

storing picture information acquired from a capturing unit or outputted from picture storage unit;

tracking individual objects with respect to the picture information and outputs tracked results of the respective objects every frame of the image information;

accumulating tracking times of the respective objects regarding the tracked results of the respective objects;

storing information regarding the tracked results of the respective objects, information regarding the accumulated tracking times, and information regarding the respective objects in a database unit; and retrieving the information stored in the database unit.

According to the present invention, there is also provided an object tracking apparatus, comprising:

a storing unit that stores picture information acquired from a capturing unit or outputted from picture storage unit;

an object tracking unit that tracks individual objects with respect to the picture information and outputs tracked results of the respective objects every frame of the image information;

a tracking time accumulating unit that accumulates tracking times of the respective objects regarding the tracked results of the respective objects;

a database unit that stores information regarding the tracked results of the respective objects, information regarding the accumulated tracking times, and information regarding the respective objects; and a retrieving unit that retrieves the information stored in the database unit.

In the above arrangement and method, the identifications of the respective objects, the positional information of the specific object, and the time information are combined with each other, so that the action tracks of the respective objects and the staying times of these objects at the respective places can be calculated. Also, with respect to all of the objects appeared on the screen, such a database related to the tracking information and the staying time information can be constructed. Then, the retrieving function related to the actions of the objects can be realized based upon the constructed database.

According to the present invention, there is also provided an object tracking method, comprising:

storing a plurality of picture information acquired from a capturing unit or outputted from picture storage unit into a plurality of storing units;

tracking individual objects with respect to the picture information and output tracked results of the respective objects every frame of the image information;

tracking the same object captured among a plurality of the capturing units based on the tracked results of the respective objects;

switching the plurality of picture information of the storing units in accordance with the tracked result of the same object among the capturing units; and recording the picture information switched in the switching process.

According to the present invention, there is also provided an object tracking apparatus, comprising:

a plurality of storing units that store a plurality of picture information acquired from a capturing unit or outputted from picture storage unit;

a plurality of object tracking units that track individual objects with respect to the picture information and output tracked results of the respective objects every frame of the image information;

a traversing object tracking unit that tracks the same object captured among a plurality of the capturing units based on the tracked results of the respective objects;

a switching unit that switches the plurality of picture information of the storing units in accordance with the tracked result of the same object among the capturing units; and a recording unit that records the picture information switched by the picture switching unit.

In the above arrangement and method, in such a case that a series of movement of a specific object is monitored in the system where a plurality of capturing units have been installed, the operator no longer switches the pictures in a manual mode in response to the movement of the specific object which is extended over the plural capturing units, so that the pictures can be automatically switched in response to the movement of the specific object which is extended over the plural capturing units. Also, since the picture switching unit is connected to the recording apparatus, only such a picture related to the movement of the specific object can be recorded, and thus, the recording operation related to the specific object can be carried out.

Preferably, the object tracking method further comprises:

previously performing a geometrical calibration of each of the storing units in order to improve tracking precision of the object among the capturing units; and unifying results of the respective geometrical calibrations of the storing units, wherein a positional relationship among the capturing units is employed for tracking the object in a case that an object extended over the capturing units is tracked.

Preferably, the object tracking apparatus, further comprises:

a calibration unit that previously performs a geometrical calibration of each of the storing units in order to improve tracking precision of the object among the capturing units; and an inter-capturing units geometrical positional relationship matching unit that unifies results of the respective geometrical calibrations of the storing units, wherein a positional relationship among the capturing units is employed for tracking the object in a case that an object extended over the capturing units is tracked.

In the above arrangement and method, the positional relationship among the capturing units can be grasped by the inter-capturing units geometrical positional relationship matching unit, and also, in the case that such an object extended over the plural capturing units is tracked, the object tracking apparatus can track this object in high precision by employing the positional relationship among the plural capturing units.

According to the present invention, there is also provided an object tracking method, comprising:

storing picture information acquired from a capturing unit or outputted from picture storage unit;

tracking individual objects with respect to the picture information;

outputting tracked results of the respective objects every frame of the image information; and performing a recording operation by using a tracked region of each of the objects outputted in the outputting process; and setting a set value, wherein the recording operation is performed based on the set value.

According to the present invention, there is also provided an object tracking apparatus, comprising:

a storing unit that stores picture information acquired from a capturing unit or outputted from picture storage unit;

a object tracking unit that track individual objects with respect to the picture information and outputs tracked results of the respective objects every frame of the image information; and a recording unit that performs a recording operation by using a tracked region of each of the objects outputted from the object tracking unit; and a setting unit that sets a set value, wherein the recording unit performs the recording operation based on the set value.

In the above arrangement and method, since the regional information as to the respective objects is utilized, only the region of the specific object can be recorded while the recording operation of the region except for the region of interest is not carried out. Also, based upon the setting value of the record setting unit 124, as to the region of the specific object, the recording operation is carried out in the low compression ratio and the high resolution, whereas as to the region other than this specific object region, the recording operation is carried out in the high compression ratio and the low resolution.

BRIEF DESCRIPTION OF THE DRAWINGS

The above objects and advantages of the present invention will become more apparent by describing in detail preferred exemplary embodiments thereof with reference to the accompanying drawings, wherein:

FIG. 14 shows information stored in a data base unit of the object tracking apparatus according to the third embodiment of the present invention;

FIG. 15 is examples of screens displaying information obtained by searching the data base unit;

FIG. 21 is an explanatory diagram for explaining the object tracking apparatus according to the fifth embodiment of the present invention.

DETAILED DESCRIPTION OF THE PREFERRED EMBODIMENTS

Referring now to drawings, an object tracking method and an object tracking apparatus according to embodiments of the present invention will be described.

First Embodiment

An object tracking method of a first embodiment of the present invention will now be explained with employment of FIG. 1 to FIG. 10.

Figure 1:
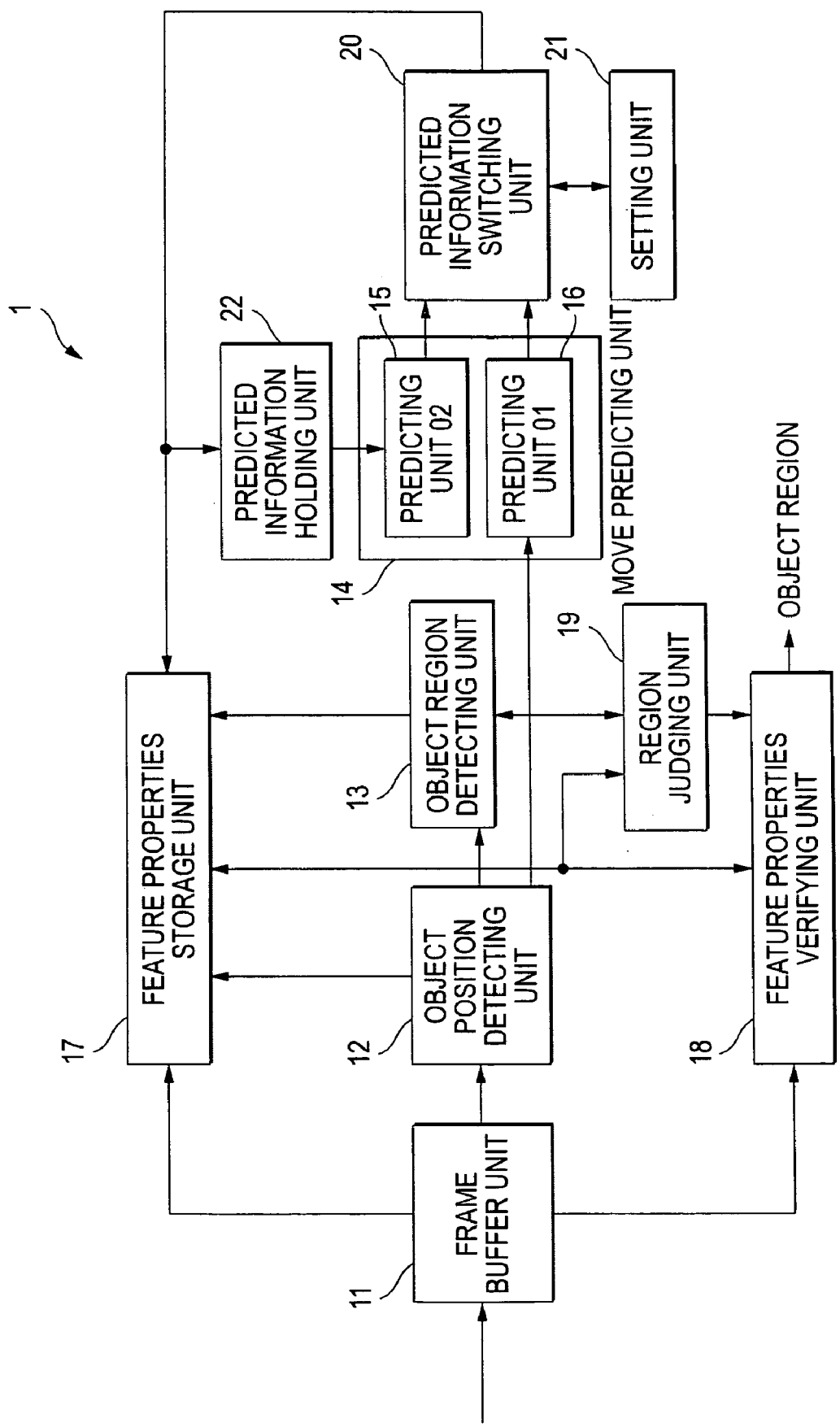
FIG. 1 is a unit diagram for showing an object tracking apparatus according to a first embodiment of the present invention.

In FIG. 1, an object tracking apparatus 1 capable of realizing the object tracking method according to the first embodiment of the present invention includes a frame buffer unit 11, an object position detecting unit 12, an object region detecting unit 13, a feature properties storage unit 17, a move predicting unit 14, a predicted information switching unit 20, a predicted information storing unit 22, a region judging unit 19, and a feature properties verifying unit 18. The frame buffer unit 11 stores there into a picture frame which is outputted from a picture storage apparatus, or a camera for capturing movement of a person. The object position detecting unit 12 detects positional information of an image of an object such as a person and a vehicle from an entered picture frame. The object region detecting unit 13 detects a region which contains the image of the relevant object with reference to the positional information detected by the object position detecting unit 12. The feature properties storage unit 17 stores there into both a position of the image of the detected object, and a color, a pattern of a cloth of the object present within the region obtained by the object region detecting unit 13. While the positional information detected by the object position detecting unit 12 and the previous positional information are inputted to the move predicting unit 14. The move predicting unit 14 predicts move positions of next frames with respect to the respective inputted positional information. The predicted information switching unit 20 switches the predicted values of the next frames outputted from the move predicting unit 14 to select any one of the predicted values in accordance with a value of a setting unit 21. The predicted information storing unit 22 holds a predicted value. The region judging unit 19 determines a move region range of an image of an object of the next frame based upon the predicted value of the next frame obtained from the predicted information switching unit 20, and the information obtained from the object position detecting unit 12. The feature properties verifying unit 18 verifies the feature properties stored in the feature properties storage unit 17 with respect to the information of the frame buffer unit 11 within the region obtained by the region judging unit 19, and outputs such a position whose verified result is resembled in the highest degree. The feature properties means at least one of the features of the object, for example, edge information of the object, color information of the object, position information of a head portion of the object and texture information of the object.

Figure 2:
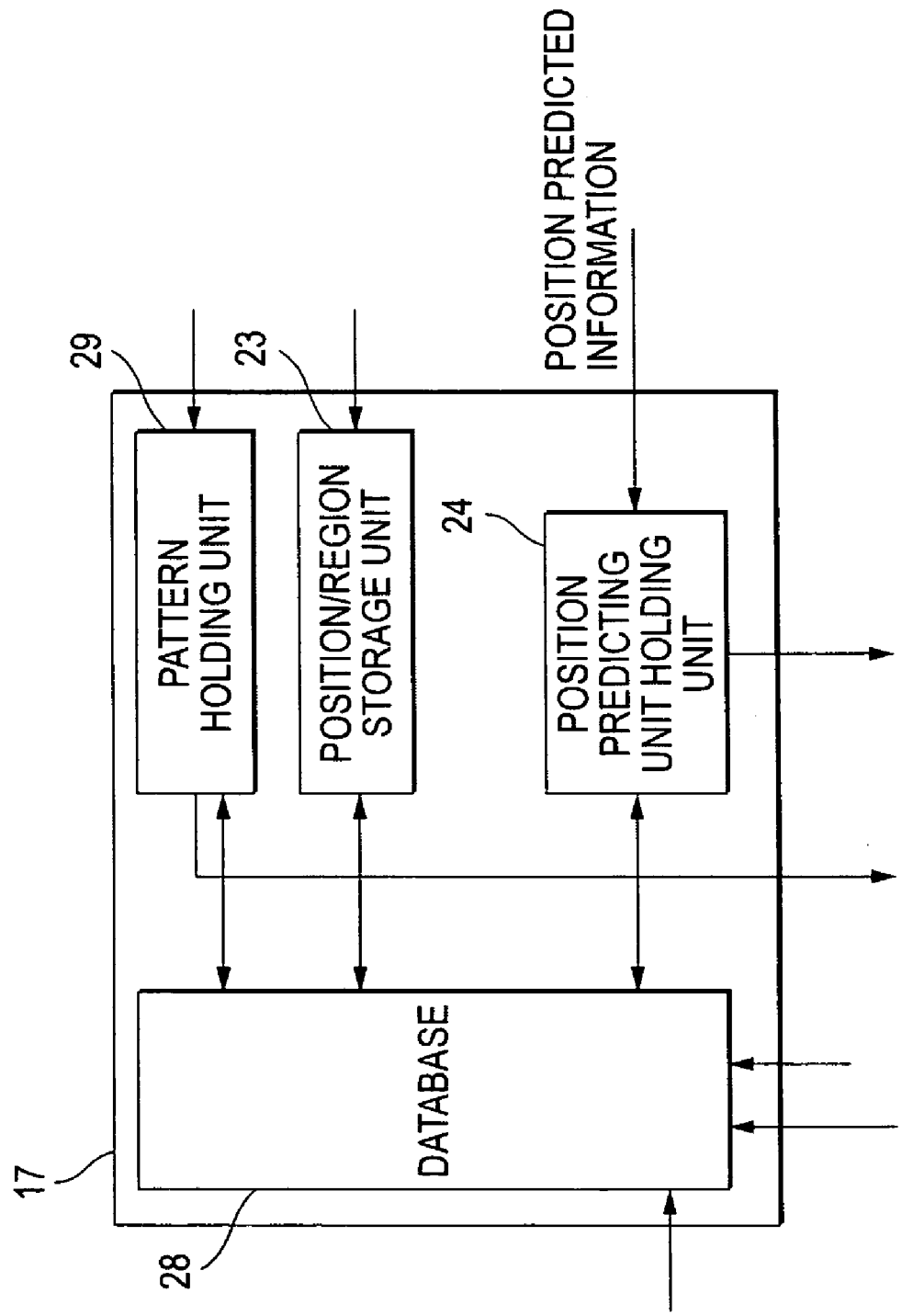
FIG. 2 is a feature properties storage unit of the object tracking apparatus according to the first embodiment of the present invention.
Figure 3:
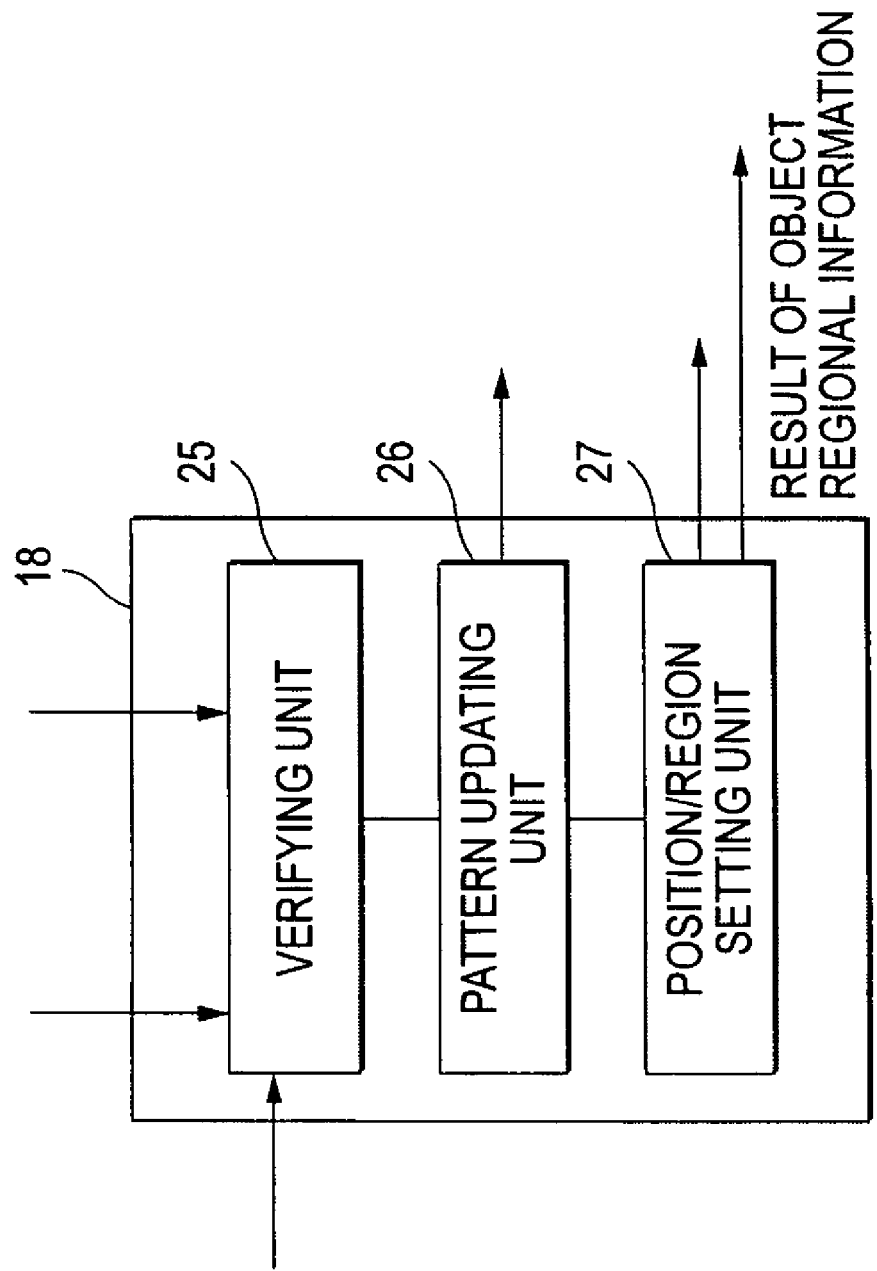
FIG. 3 is a feature properties verifying unit of the object tracking apparatus in the first embodiment of the present invention.

Also, in FIG. 2, the feature properties storage unit 17 includes a pattern storing unit 29, a position/region storage unit 23, a position predicted portion storing unit 24, and a database unit 28 The pattern storing unit 29 stores there into a feature properties of an image of an object. The position/region storage unit 23 stores there into both positional information and regional information of the image of the object.

The position predicted portion storing unit 24 stores there into the predicted positional information. The database unit 28 stores there into the data of the respective holding/storage units 22, 23, 24.

Also, the feature properties verifying unit 18 includes a verifying unit 25, a pattern updating unit 26, and a position/region determining unit 27. The verifying unit 25 verifies resemblance degrees of feature properties of the images of the objects with each other within a region detected by the region judging unit 19. The pattern updating unit 26 sets the verified result by the verifying unit 25 as a feature properties pattern an image of a new object, updates the pattern, and registers the updated pattern to the pattern storing unit 29. The positional information determining unit 27 determines both a position and a region of an image of an object based upon the verified result obtained from the verifying unit 25, and then, outputs the acquired object regional information.

Figure 4:
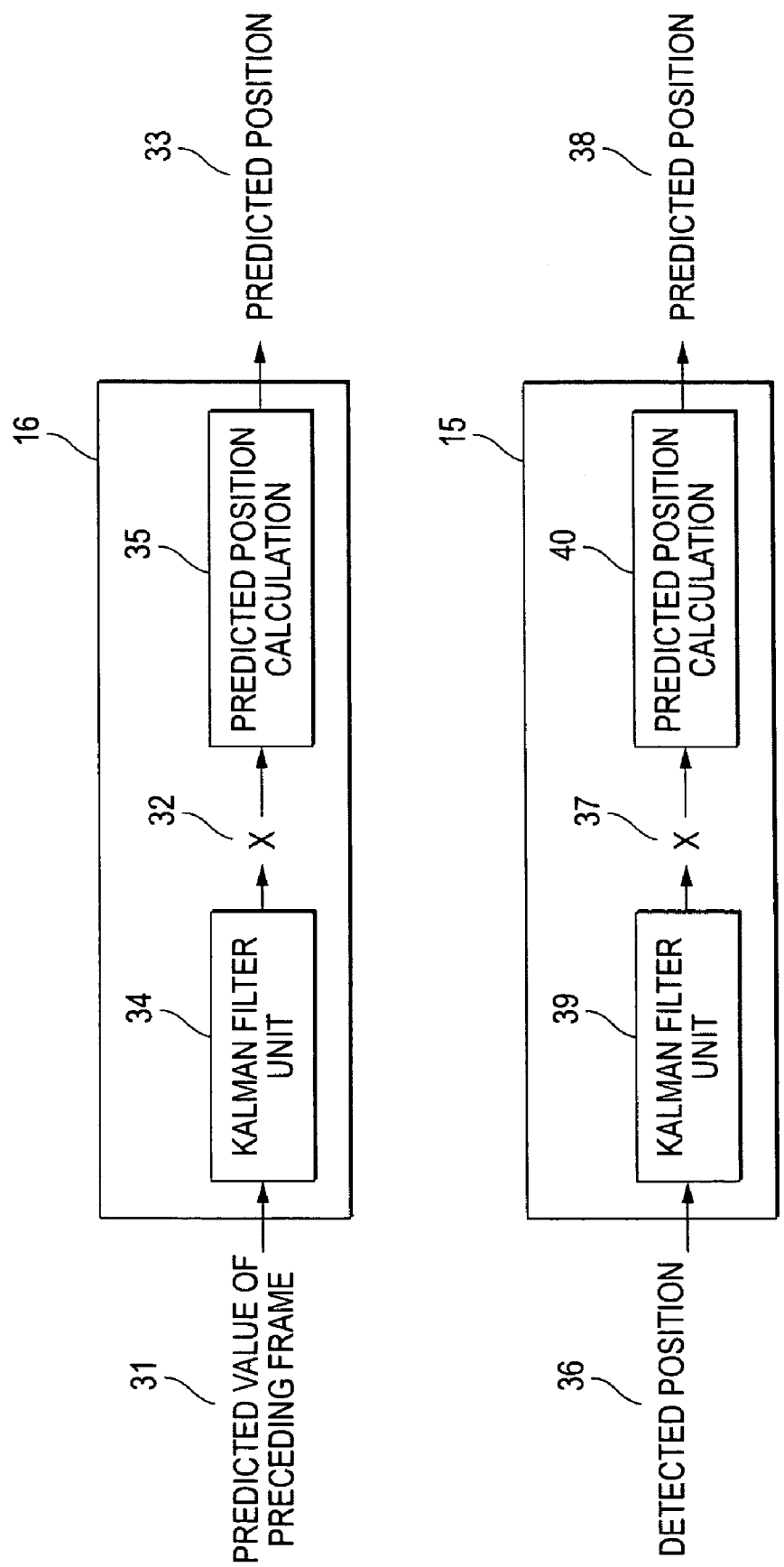
FIG. 4 is predicting units of the object tracking apparatus according to the first embodiment of the present invention.

Also, in FIG. 4, a first predicting unit 15 and a second predicting unit 16 are configured by Kalman filter units 34, 39 and predicted position calculating units 35, 40 respectively.

Figure 5:
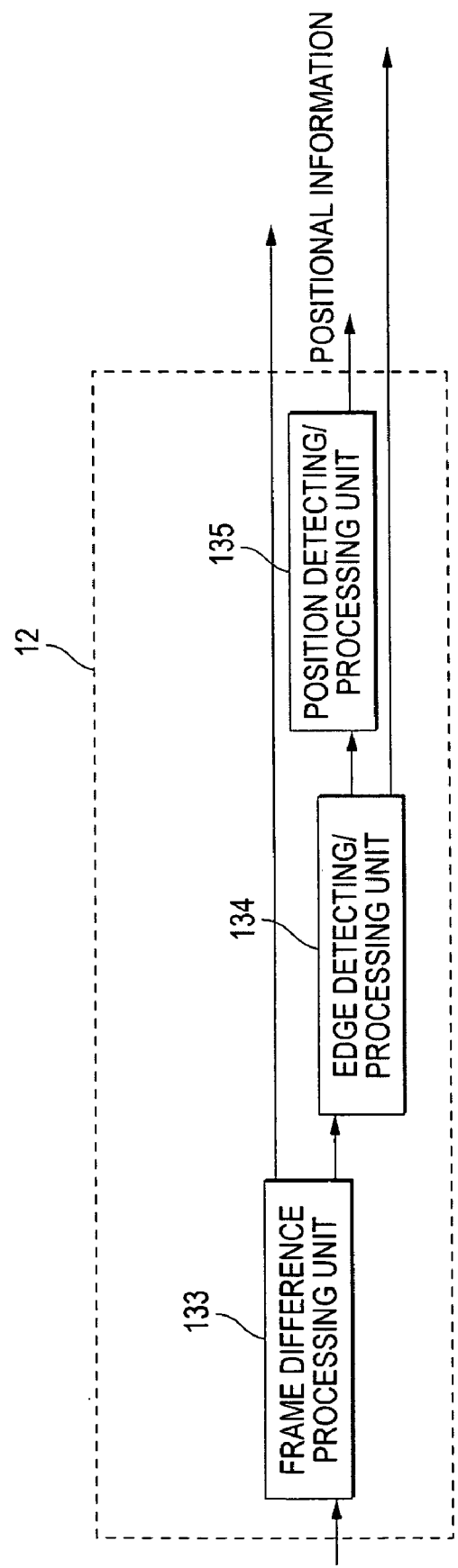
FIG. 5 is an object position detecting unit of an object tracking apparatus according to the first embodiment of the present invention.

In FIG. 5, the object position detecting unit 12 is realized by a frame difference processing unit 133, an edge detecting process unit 134, and a position detecting process unit 135.

Figure 6:
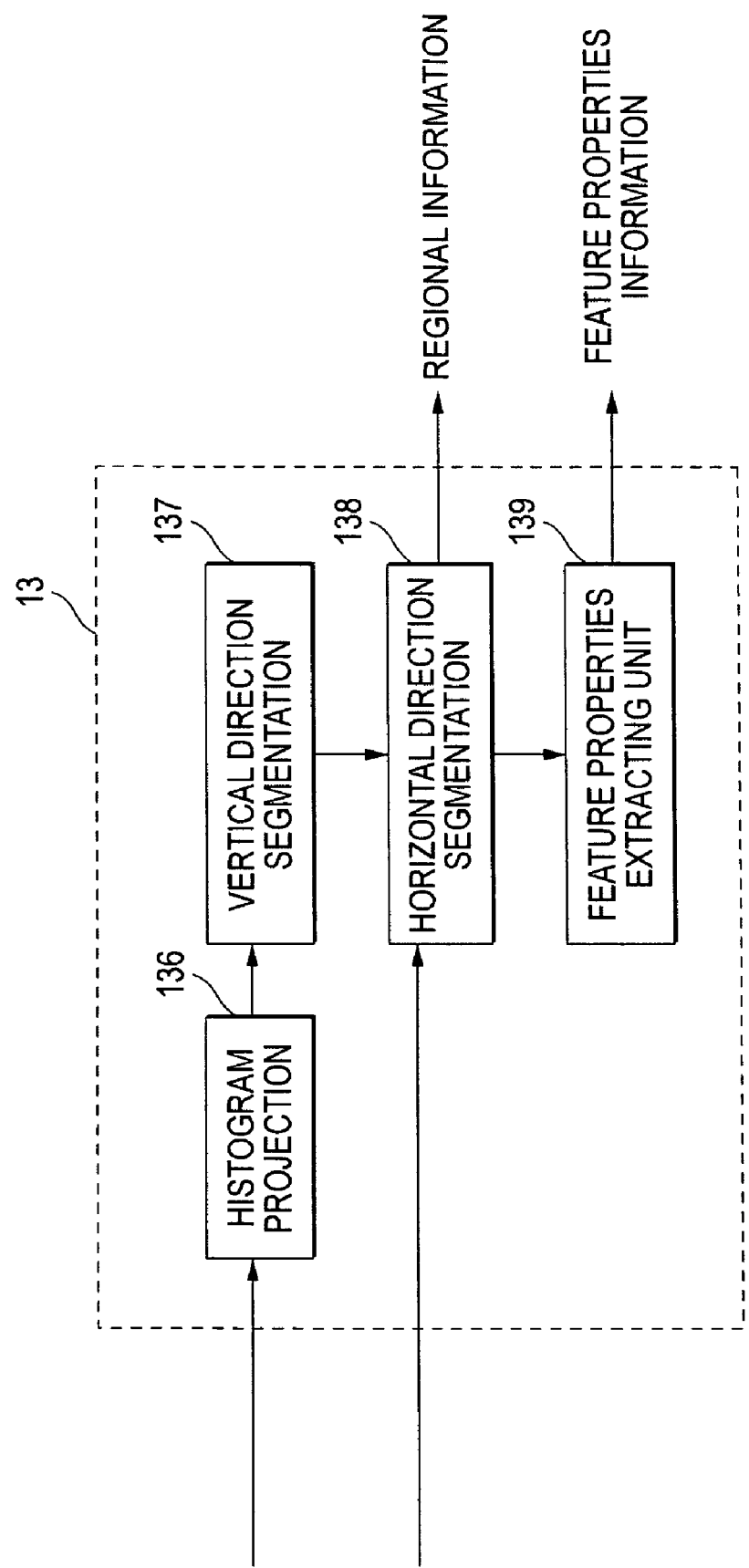
FIG. 6 is object region detecting unit of an object tracking apparatus according to the first embodiment of the present invention.

In FIG. 6, the object region detecting unit 13 has been arranged by a histogram projecting unit 136, a vertical segmentation unit 137, a horizontal segmentation unit 138, and a feature properties extracting unit 139. The histogram projecting unit 136 produces a histogram of edge components along vertical and horizontal directions. The vertical segmentation unit 137 detects a position of an image of an object, as viewed from the vertical direction. The horizontal segmentation unit 138 detects a position of an image of an object, as viewed from the horizontal direction. The feature properties extracting unit 139 extracts a feature properties of an image of an object.

As to the object tracking method realized by the object tracking apparatus 1 with employment of the above explained arrangement, the tracking operations will now be described.

Figure 8:
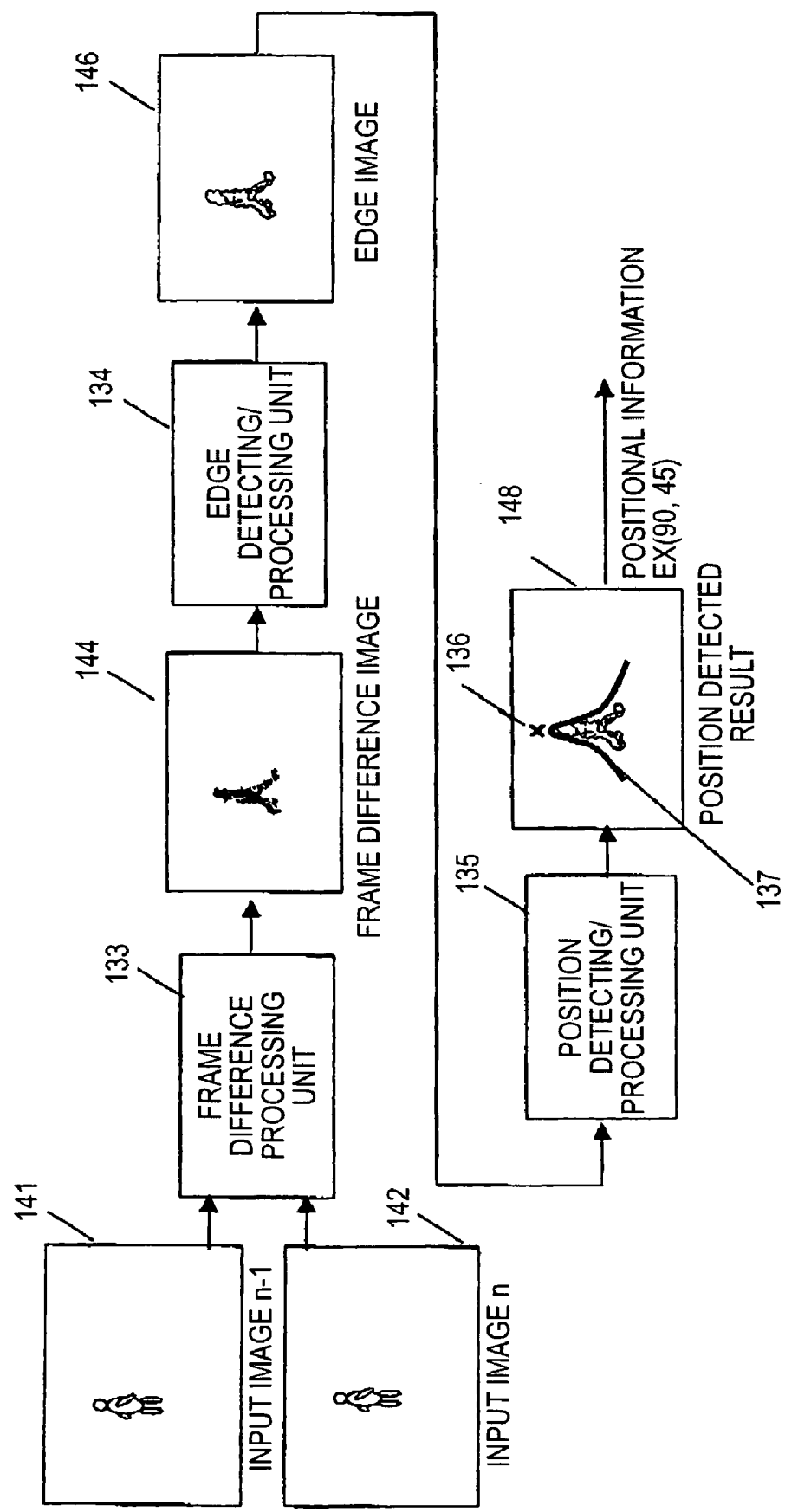
FIG. 8 is a position detecting process of the object tracking apparatus according to the first embodiment of the present invention.

FIG. 8 indicates operations of the above-described object position detecting unit 12. In this object position detecting unit 12, time sequential images obtained from the frame buffer unit 11, for instance, an input image n-1_141 and an input image n_142 are entered as input images. Then, a frame difference processing operation is carried out by the frame difference processing unit 143 with respect to these time sequential images, so that a frame difference processed image 144 is obtained. The resultant frame difference processed image 144 is processed by the edge detecting processing unit 134 in an edge detecting process operation, so that an edge image 146 is obtained. Furthermore, the position detecting process unit 135 performs a position detecting process operation with respect to the edge image 146.

In accordance with the positional detecting process operation, for instance, an envelope 137 is extracted with respect to the edge image 146, and an extremal value 136 of the extracted envelope 137 can be outputted as a position detected result 148.

Figure 9:
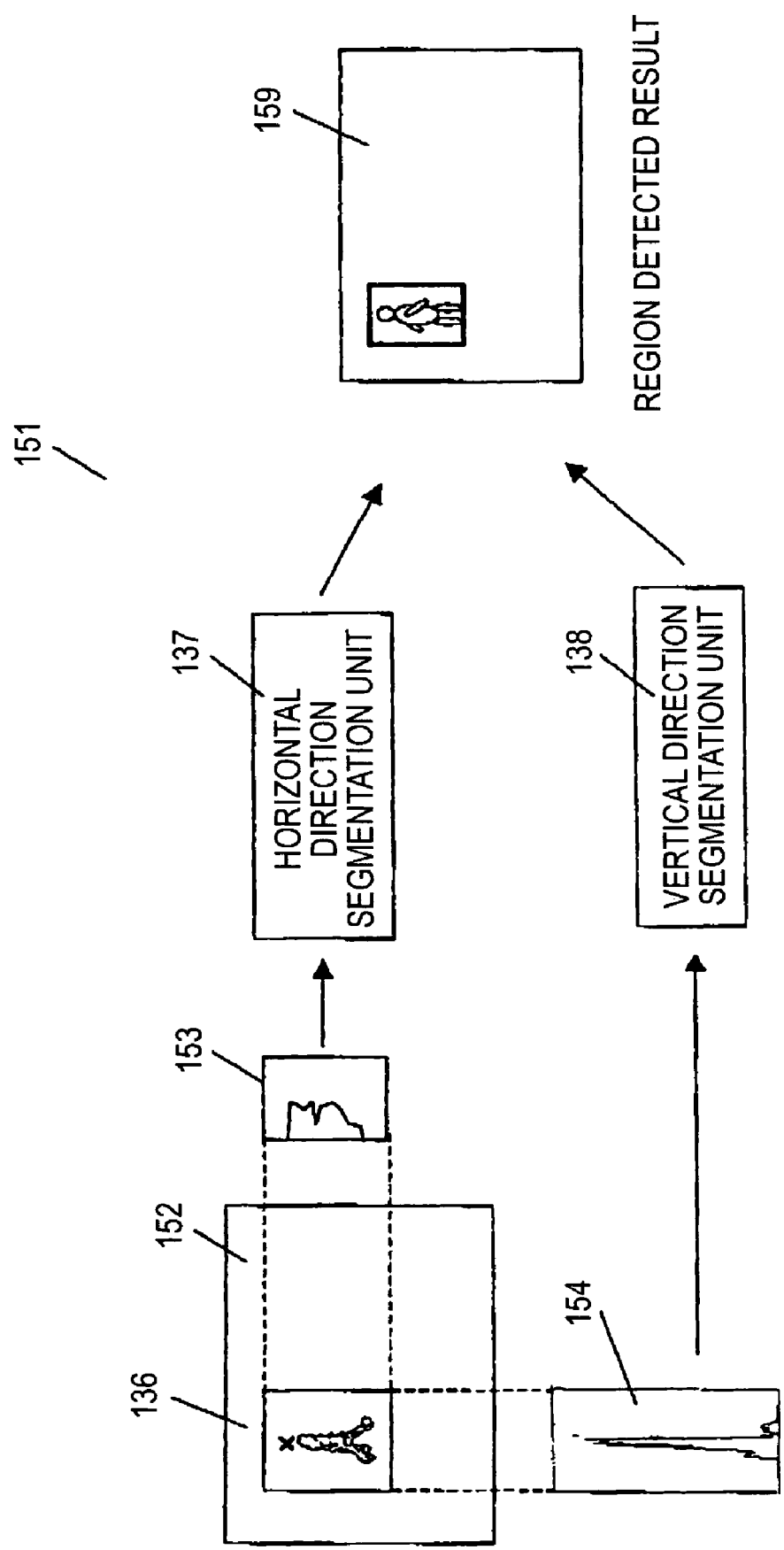
FIG. 9 is an object region detecting unit of the object tracking apparatus according to the first embodiment of the present invention.
Figure 10:
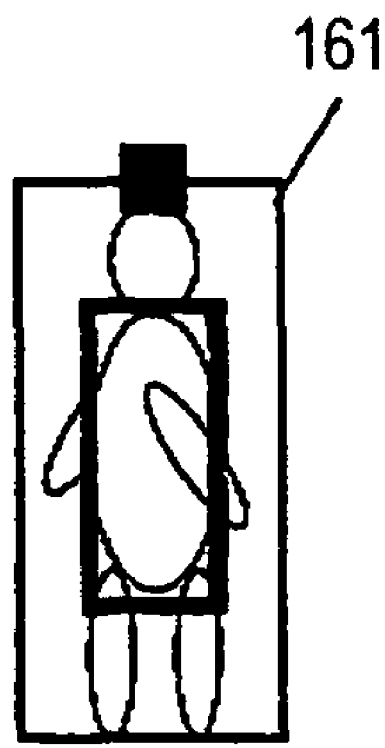
FIG. 10 shows regional information of a region detected result obtained by the object tracking apparatus according to the first embodiment of the present invention.

FIG. 9 shows operations of the above-described object region detecting unit 13. While the extremal value 136 obtained by the object position detecting unit 12 is used as a base point, the object region detecting unit 13 executes a histogram processing operation with respect to a constant range so as to obtain both a histogram 154 of the vertical direction and another histogram 153 of the horizontal direction.

A vertical segmentation 138 and a horizontal segmentation 137 are performed with respect to the histogram 154 of the vertical direction and the histogram 153 of the horizontal direction, so that a region detected result 159 is obtained. Then, this region detected result 159 is outputted as regional information 161 of FIG. 10. Also, with respect to the obtained regional information 161, in the case that the image of the object corresponds to a person, a lower portion of a head portion, namely, a body portion region may be alternatively held as a feature properties region in addition to feature properties (color information and pattern information) of the entire region. It should be noted that since a head portion, an abdomen portion, an arm portion, a foot portion, and the like are recognized by way of a technical method such as a pattern matching method, information as to the respective portions in a person may be alternatively employed as feature properties. In the above-explained example, the dynamic object region has been acquired by the frame difference. Alternatively, both positional information and regional information of respective objects may be extracted in such a manner that a region of a foreground different from a background is extracted by a background difference method, this extracted region is employed as an object region candidate, and then, the succeeding process operations are carried out. Further, both object positional information and object regional information may be alternatively extracted by employing both the frame difference method and the background difference method. As the detecting method of the positional information, in the above-described example, such a method has been indicated by which the envelop has been extracted with respect to the edge information. Alternatively, in the case that the image of the subjective object corresponds to a person, a face region may be detected, so that this detected result may be used as positional information. Further, as the face detecting method, an elliptic region may be alternatively detected, so that this detected result may be alternatively used as this positional information.

Also, the move predicting unit 14 has been arranged by the Kalman filter unit 34 and the predicted position calculating unit 35. When a present position such as a position of an image of an object is applied to a Kalman filter, this Kalman filter calculates a parameter (X) so as to calculate a position after the image of the object has been moved. Since the parameter X is employed, a next predicted position of the image of the object can be calculated.

In the move predicting unit 14, the predicting unit 16 outputs the next predicted position of the image of the object by employing the position of the image of the object detected by the object position detecting unit 12. On the other hand, the predicting unit 15 outputs a next predicted position of the image of the object by employing the predicted positions which have been so far outputted by the move predicting unit 14.

Figure 7:
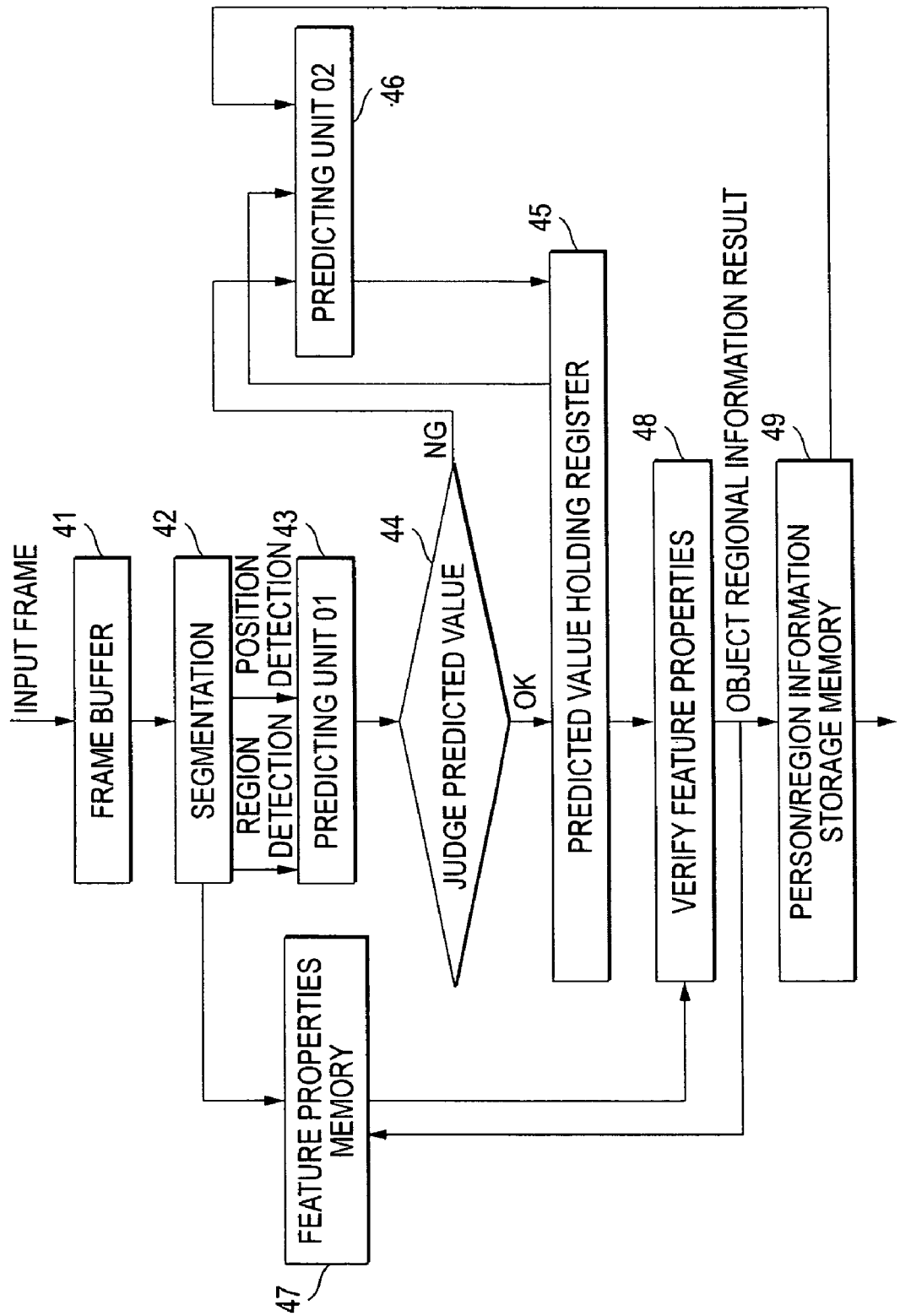
FIG. 7 is a flow chart for explaining process operations of an object tracking apparatus according to the first embodiment of the present invention.

The setting unit 21 selects a value which is inputted to the predicted information switching unit 20 based upon a previously set value. As a setting example, while a calculation is made of a selected value, in the case that a previously acquired value is located within a threshold value with respect to the value outputted from the predicting unit 16, the setting unit 21 selects the value outputted from the predicting unit 16, and defines this value as the output of the predicted information switching unit 20. Also, in the case that the previously acquired value exceeds the threshold value, the setting unit 21 judges that a value outputted by the predicting unit 16 corresponds to a value which is largely deviated from the previously acquired value, and selects the value outputted by the predicting unit 15 to define this selected value as the output of the predicted information switching unit 20. As a result, the output of the predicted information switching unit 20 corresponds to a predicted value for the position of the next frame, and this value is entered to the position predicted portion storing unit 24. Then, when the position and the region of the image of the object of the next frame are detected, a move predicted range of an object whose feature properties will be verified by the feature properties verifying unit 18 may be determined by employing a predicted value held in the position predicted portion storing unit 24. With respect to this move predicted range, the feature properties are verified by the verifying unit 25. As a result of verification, a head position of a portion having the highest resemblance degree is determined as a move point, and then, this region is determined as a region of the object. This determined result is outputted as a result of object regional information by the position/region determining unit 27. Also, the feature properties is updated by the pattern updating unit 26, and this updated feature properties is stored in the pattern storing unit 29. Also, a flow chart for explaining the flow operations of this process operation is indicated in FIG. 7.

In accordance with the first embodiment of the present invention, when the pattern matching operation is carried out by employing the feature properties of the image of the objects, since the positions of the image of the objects and the range of the region where the objects are moved are optimized, the calculation region of the pattern matching operation can be restricted. Furthermore, when a position of an image of an object and a region where the object is moved are predicted, the position of the image of the object may be predicted by the predicting unit 16 of the move predicting unit 14, while the object detected position of the present frame is employed as the input value. In such a case that a correct value as to the positional information to be observed cannot be obtained due to the adverse influence of the noise, the correct position and the correct region of the image of the object of the next frame cannot be predicted. However, both the predicted output from the predicting unit 16 which inputs the present observation value, and the predicted output from the predicting unit 15 are conducted, in such a case that the noise is superimposed on the positional information of the image of the object obtained from the present frame, the adverse influence caused by the noise can be avoided by employing the predicted position obtained by the predicting unit 15, while the predicting unit 15 predicts the move position of the image of the object in the next frame by entering such a predicted value in which the move position of the image of the object has been predicted based upon the preceding frame. Also, since the feature properties of the image of the object is sequentially updated, the highly reliable tracking operation can be carried out. Even when a plurality of the images of objects appear, the images of the respective objects can be discriminated from each other, and also, the images of the respective objects can be separately tracked.

Second Embodiment

Figure 11:
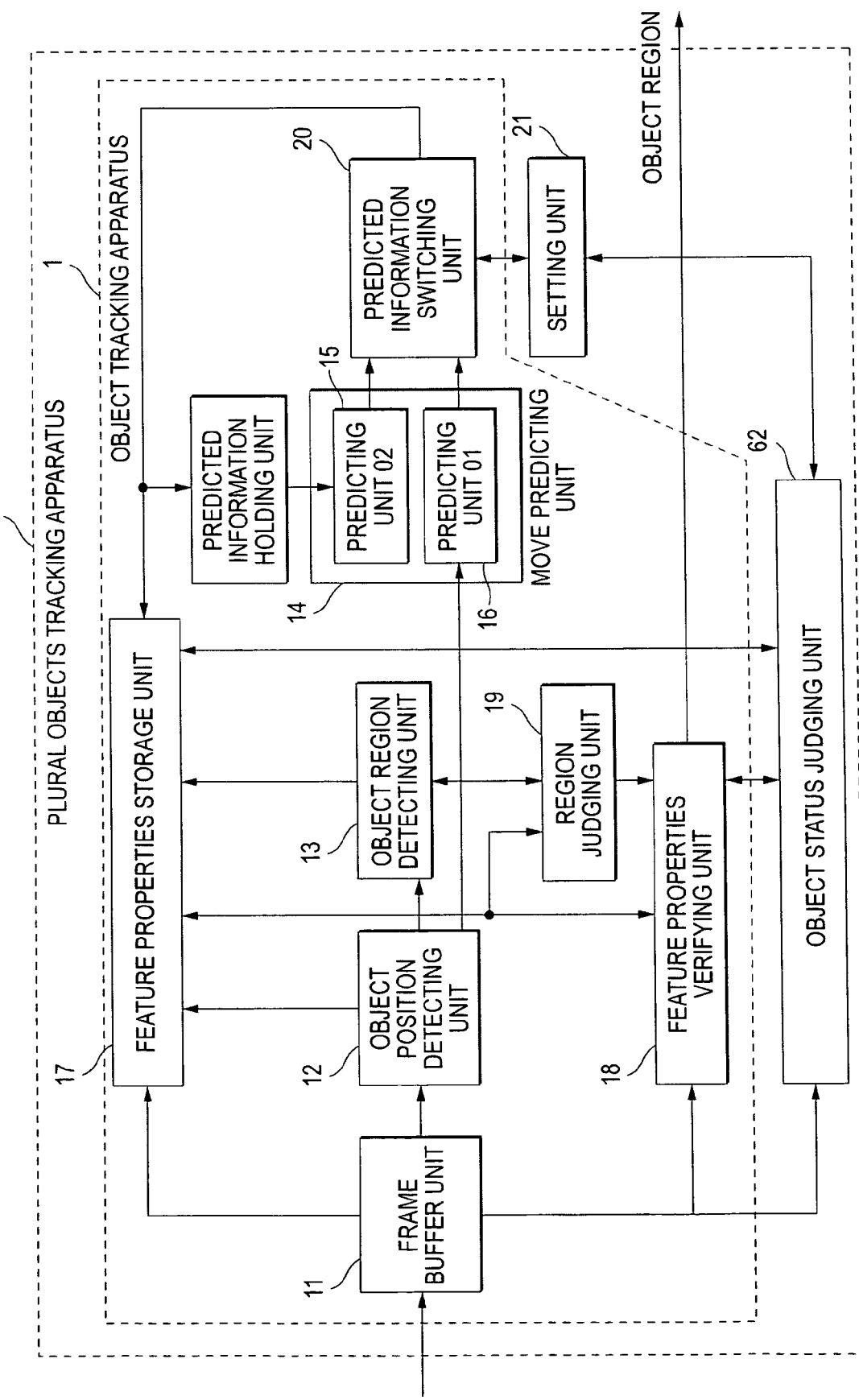
FIG. 11 is an object tracking apparatus according to a second embodiment of the present invention.

Next, FIG. 11 indicates an object tracking apparatus 63 for realizing an object tracking method according to a second embodiment of the present invention.

Figure 12:
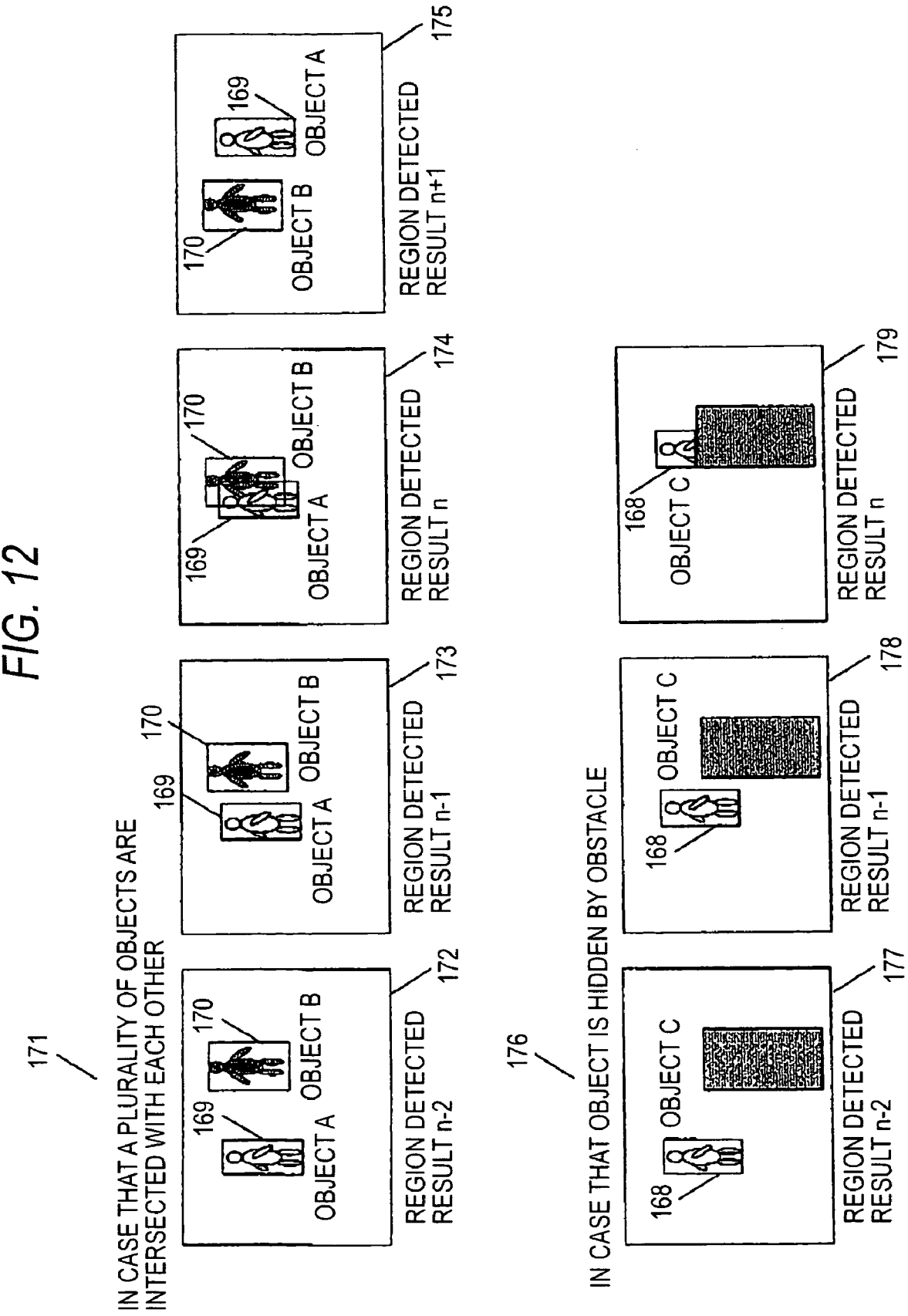
FIG. 12 is an explanatory diagram for explaining an operation of the object tracking apparatus according to the second embodiment of the present invention.

In comparison with the first embodiment, the object tracking apparatus 63 for realizing the object tracking method of the second embodiment includes an object status judging unit 62 additionally employing the object tracking apparatus 1 described in the first embodiment. This object status judging unit 62 judges a status of an object based upon an object region given by the feature properties verifying unit 18 and a feature properties stored in the feature properties storage unit 17. Also, the setting unit 12 determines data which should be set by the object status judging unit 62. A description is made of process operations of the object tracking apparatus 63 with employment of the above-explained arrangement with reference to FIG. 11 and FIG. 12.

In the object tracking apparatus 63, positions and regions of images of plural objects are detected with respect to frames which have been sequentially inputted; feature properties of the images of the respective objects are extracted; and the extracted feature properties are stored in the feature properties storage unit 57. The object status judging unit 62 judges a status of an extracted object, namely, has such a function capable of judging that the object is under which status. In the case that images of a plurality of objects are present, the object status judging unit 62 judges that the images of the plural objects are mutually under which statuses. In the case (171) that images of a plurality of objects intersect one another, as a region detected result n-2_172, an object A_169 and another object B_170 (shown in FIG. 12) are detected; a feature properties of each of these objects at this time is stored in the feature properties storage unit 57; and the object status judging unit 62 judges that the object A_169 and the object B_170 are under sole statuses. Thereafter, also, in a region detected result n-1_173, the object A_169 and the object B_170 are similarly detected; a feature properties of each of the images of these objects at this time is stored in the feature properties storage unit 57; and the object status judging unit 62 judges that the object A_169 and the object B_170 are under sole statuses. Thereafter, as a region detected result n_174, in the case that the object A_169 is intersected with the object B_170, an overlapped portion is produced in the region detected result n_174. At this time, the object status judging unit 62 judges that the object A_169 and the object B_170 are under intersection statuses. At this time, there are two cases that feature properties of the respective objects A_169 and B_170 are stored in the feature properties storage unit 57, and are not stored there into, depending upon a step value which has been previously set Normally, when images of objects intersects one another, feature properties of the images of these objects are not updated. Also, the object status judging unit 62 also senses changes of statuses of images of objects. In the case (176) that an image of an object is hidden by an obscuration, when an object C_168 is extracted as a region detected result n-2_177, the object status judging unit 62 judges that the object C_168 is under sole status. A region detected result n-1_178 is similar to the above-described region detected result n-2_177. As a region detected result n_179, in the case that the object C_168 has been similarly captured similar to the region which is tracked and subsequent to the preceding frame, when a difference between a dimension of the region detected in the preceding frame and a dimension of the region detected in the present frame is larger than a preset threshold value, the object status judging unit 61 judges that this object C_168 is under changing status. At this time, there are two cases that a feature properties of the object C_168 is stored in the feature properties storage unit 57, and is not stored there into, depending upon a set value which has been previously set. Normally, when an image of an object is under changing status, it is so assumed that a feature properties of the image of this object is not updated. The status judged results of the images of the objects which have been acquired in the above-explained manner are inputted to the setting unit 61. Upon receipt of these status judged results, the setting unit 61 makes such a setting operation by employing the result of the predicting unit 02_55, since there are some cases that the reliability of the position detected results may become unstable when images of objects intersect one another, and also, an image of an object is under changing status. Also, when an image of an object is under sole status, or an image of an object is not changed, there are many cases that the reliability of the position detected results is high, the setting unit 61 makes such a setting operation by employing the result of the predicting unit 01_56. It should also be noted that the object status judging unit 62 may alternatively judge a degree of intersection, namely, how degree regions are overlapped with each other, or judge how degree an object is changed from the previous status. Then, this judgment result is inputted to the setting unit 61. The setting unit 61 may alternatively set a threshold value in response to this judged degree, and then, may alternatively select the value of the predicting unit 01_56, or the value of the predicting unit 02_55.

When the object status judging unit 62 judges that the intersection of the images of the respective objects is accomplished, in order that the detected plural objects correspond to which objects before the intersection thereof, the feature properties verifying unit 18 performs the verifications with respect to the detected objects by employing the feature properties of the images of the respective objects which have been held by the pattern storing unit 29, so that resemblance degrees are calculated. Also, since positions of the images of the respective objects can be predicted by the move predicting unit 14, this move predicting unit 14 can perform a move prediction of each of the images of the objects. In other words, since the move predictions of the images of the respective objects are carried out so as to conduct velocities of the images of the objects and direction vectors before the images of these objects intersect one another, move regions of the images of the respective objects are acquired after the images of these objects have intersected one another. Thus, a corresponding relationship among the images of the objects is determined based upon the conducted move predicted regions and the resemblance degrees of the respective feature properties with respect to the images of the objects detected after the images of these objects have intersect one another.

As previously explained, the corresponding relationships between the images of the respective objects before the intersection thereof and the images of the respective objects after the intersections thereof can be established in high precision by utilizing the feature properties stored in the feature properties storage unit 17 and the move predictions of the images of the objects.

In the case of concealment, corresponding relationships between images of objects before the concealment thereof and images of objects after the concealment thereof are established in the above explained manner.

In accordance with the above-described embodiment of the present invention, the movement of the images of the respective objects can be predicted on which the statuses of the images of the respective objects have been reflected. In other words, in such a case that the positional information of the images of the objects cannot be correctly detected due to the obscuration, the concealing article, and the environmental change, such a condition that the observation value detected in the present frame is not used is set with respect to the setting unit 21. As a result, the predicted information switching unit 20 controls the selection of the value by the move predicting unit 14, so that the detected data having the low reliability can be excluded. Also, even in such a case that the images of the plural objects are overlapped with each other, or are intersected with each other, a result of judging this condition is set to the setting unit 21, and the predicted information switching unit 20 controls the selection of the value by the move predicting unit 14, so that the adverse influence caused by the detected data having the low reliability can be reduced.

Third Embodiment

Figure 13:
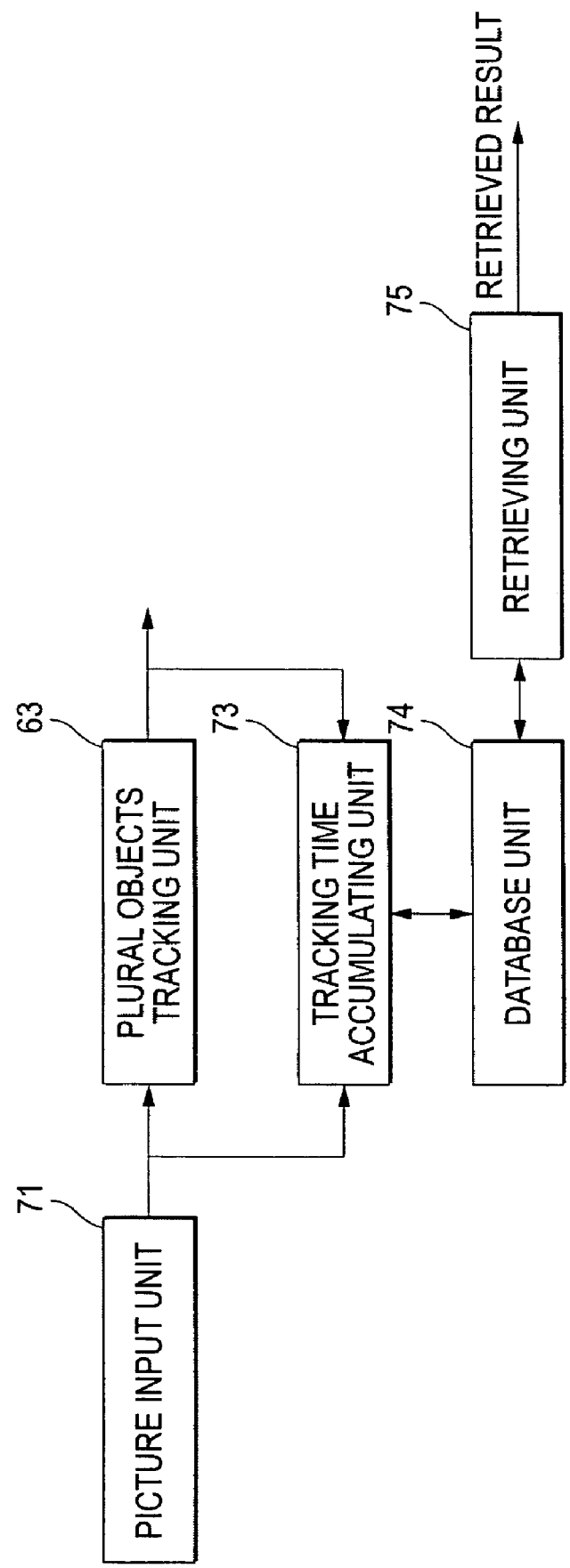
FIG. 13 is an object tracking apparatus according to a third embodiment of the present invention.

Next, FIG. 13 indicates an object tracking apparatus for realizing an object tracking method according to a third embodiment of the present invention.

In FIG. 13, the object tracking apparatus for realizing the object tracking method of this third embodiment includes a picture input unit 71, an object tracking unit 72, a tracking time accumulating unit 73, a database unit 74, and a retrieving unit 75. The picture input unit 71 inputs and stores there into a picture frame which is transmitted from a picture produced from a camera and picture information outputted from a picture storage apparatus. The camera grasps a condition of movement of a person, or monitors an occurrence of an event, and transfers a picture. The object tracking unit 72 tracks images of respective objects with respect to the picture entered from the picture input unit 71, and outputs tracked results of the images of the respective objects every frame of the input image. The tracking time accumulating unit 73 accumulates the tracking times of the images of the respective objects as to the tracked results of the images of the respective objects which are outputted from the object tracking unit 72. The database unit 74 stores there into the tracked results of the images of the respective objects, the information as to the accumulated tracking time, and the picture information of the images of the respective objects. The retrieving unit 75 retrieves the information of the database unit 74 which stores there into the tracked results of the images of the respective objects.

Referring now to FIGS. 13 to 15, operations as to the object tracking apparatus with employment of the above-explained arrangement will be described. The object tracking unit 72 tracks the images of the respective objects with respect to a picture which is inputted by the picture input unit 71. Then, with respect to the acquired tracking information of the images of the respective objects, the tracking time accumulating unit 73 accumulates tracking times, and stores a series of information as to the images of the objects in the database unit 74. As indicated in FIG. 14, such an information which is stored in the database unit 74 is constituted by an address 181 used to store this information, an object number 182 indicative of a number of an object, an input source 183, a time 184, a position 185, a region 186, and feature properties information 187. The input source 183 corresponds to information for indicating that the above-described information is entered from which input source The feature properties information 187 indicates a storage place of feature properties information of an object. The retrieving unit 75 inputs there into a retrieve condition entered from a user, and retrieves the information stored in the database unit 74 so as to output the corresponding information as a retrieved result. For instance, as indicated in an screen A_191 of FIG. 15, when such a case is considered that a detected object A_193 prowls in front of a house, both tracking information of the object A_193, and also, time accumulation information such as staying time related to this object A_193 are stored in the database unit 74. Then, the user sets a selection range 194 with respect to another screen B_192, and sets staying time with respect to the designated selection range 194. In other words, the object tracking apparatus retrieves such a case that the image of the same object is staying with respect to the same range for a predetermined time (for example, 10 or more minutes) from the database unit 74, and then, outputs the retrieved result, It should also be noted that as to the retrieve condition inputted from the user, any retrieving items may be arbitrarily combined with each other based upon the information stored in the database unit 74. For instance, various retrieving conditions of images of objects may be conceived, namely, an image of an object is retrieved in the case that two, or more persons are stayed at the same time with respect to a specific region; in such a case that an image of an object having a specific feature properties (for example, feature properties of red color) is retrieved within a designated time period; and an image of an object which has been moved from a specific region to another specific region is retrieved.

In accordance with such an object tracking apparatus of the third embodiment of the present invention, the identifications of the respective objects, the positional information of the specific object, and the time information are combined with each other, so that the action tracks of the images of the respective objects and the staying times of the images of these objects at the respective places can be calculated. Also, with respect to all of the images of the objects appeared on the screen, such a database related to the tracking information and the staying time information can be constructed. Then, the retrieving function related to the actions of the images of the objects can be realized based upon the constructed database.

Fourth Embodiment

Figure 16:
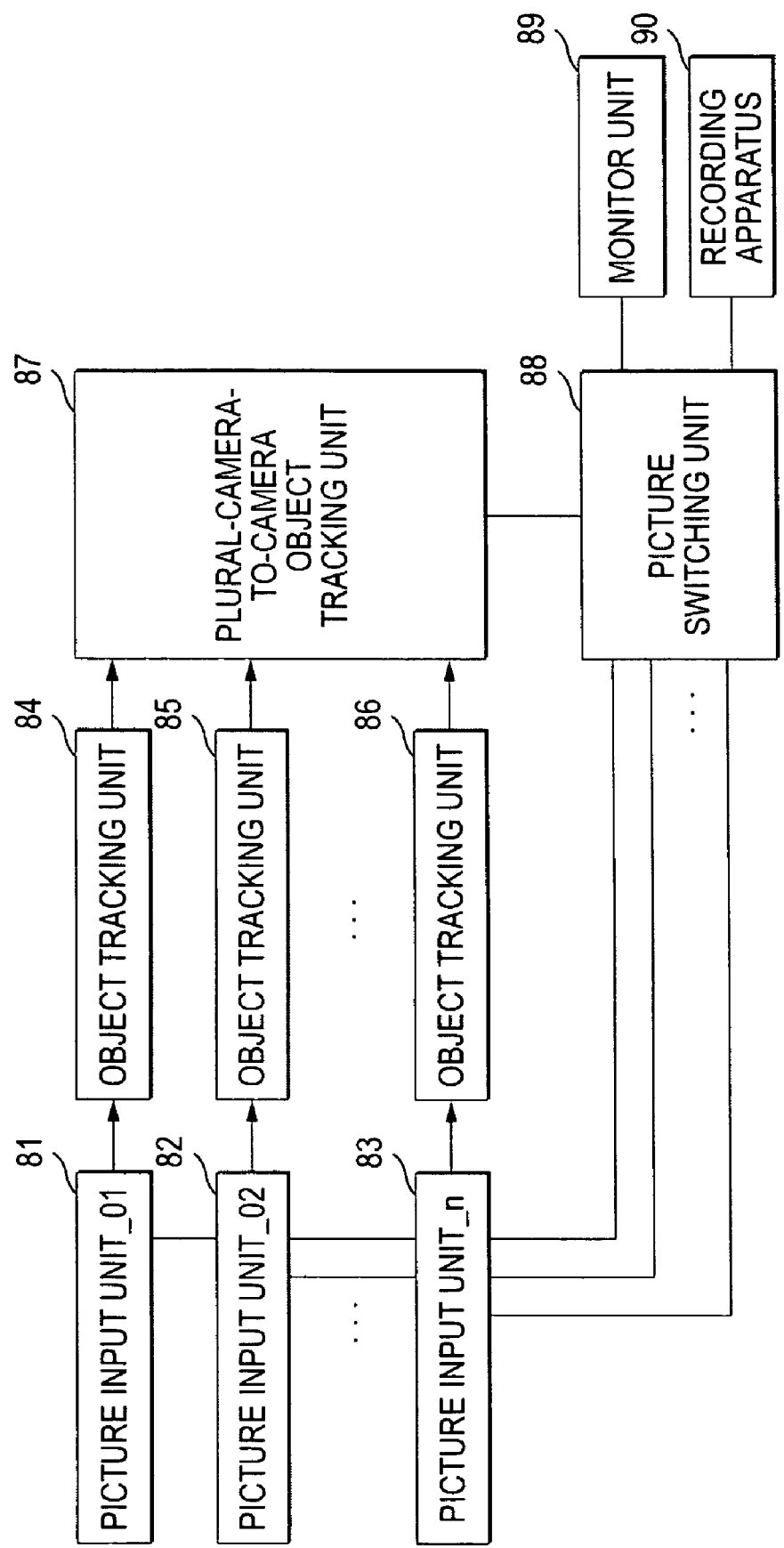
FIG. 16 is an explanatory diagram for explaining the object tracking apparatus according to a fourth embodiment of the present invention.
Figure 17:
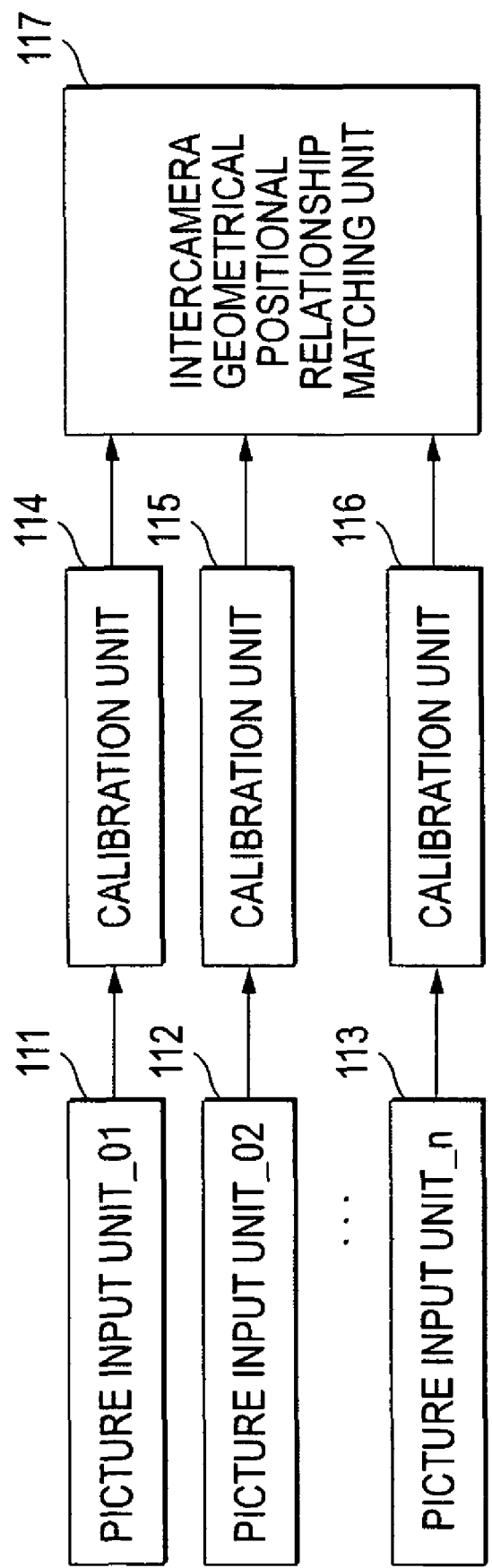
FIG. 17 is an explanatory diagram for explaining the object tracking apparatus according to the fourth embodiment of the present invention.
Figure 18:
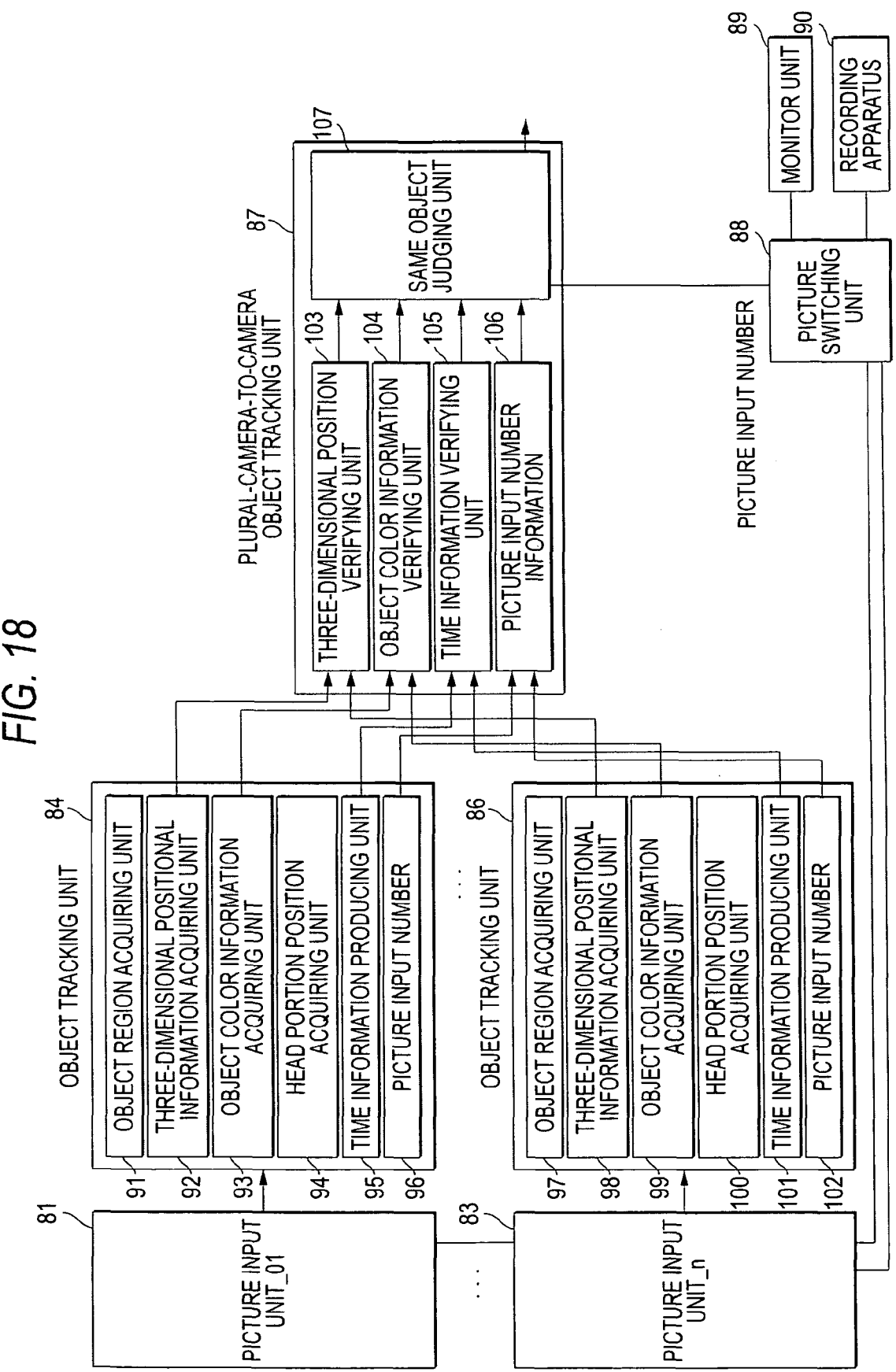
FIG. 18 is an explanatory diagram for explaining the object tracking apparatus according to the fourth embodiment of the present invention.

Next, an object tracking apparatus according to a fourth embodiment of the present invention is shown in FIGS. 16 to 18. In FIGS. 16 to 18, the object tracking apparatus of the fourth embodiment includes a plurality of picture input unit 01_81, picture input unit 02_82, picture input unit n_83; a plurality of object tracking units 84, 85, 86; a plural-camera-to-camera object tracking unit 87; a picture switching unit 88; a monitor unit 89; and a recording apparatus 90. The plural picture input units 01_81, 02_82, and n_83 input and store there into picture frames which are transmitted from pictures produced from cameras and picture information outputted from a picture storage apparatus. The cameras grasp conditions of movement of persons, or monitor an occurrence of an event, and transfer pictures. The plural object tracking units 84, 85, 86 track images of respective objects with respect to the picture entered from the plural picture input units 81, 82, 83, and then, output tracked results of the images of the respective objects every frame of the input images. The plural-camera-to-camera object tracking unit 87 inputs the tracked results of the images of the respective objects which are outputted from the plurality of object tracking units 84, 85, 86, and tracks the same object among the plural cameras. The picture switching unit 88 switches the pictures of the plural picture input units 81, 82, 83 in accordance with the tracked results of the object among the plural cameras, which are obtained by the plural-camera-to-camera object tracking unit 87. The monitor unit 89 displays the picture outputted from the picture switching unit 88. The recording apparatus 90 records thereon the picture of the picture switching unit 88. Also, the object tracking units 84, 85, 86 have been constituted by object region acquiring units 91, 97; three-dimensional positional information acquiring units 92, 98; object color information acquiring units 93, 99; head portion position acquiring unit 94, 100; time information producing units 95, 101; and also, picture input numbers 96, 102. The plural-camera-to-camera object tracking unit 87 has been constituted by a three-dimensional position verifying unit 103; an object color information verifying unit 104; a time information verifying unit 105; camera number information 106; and a same object judging unit 107.

Figure 20:
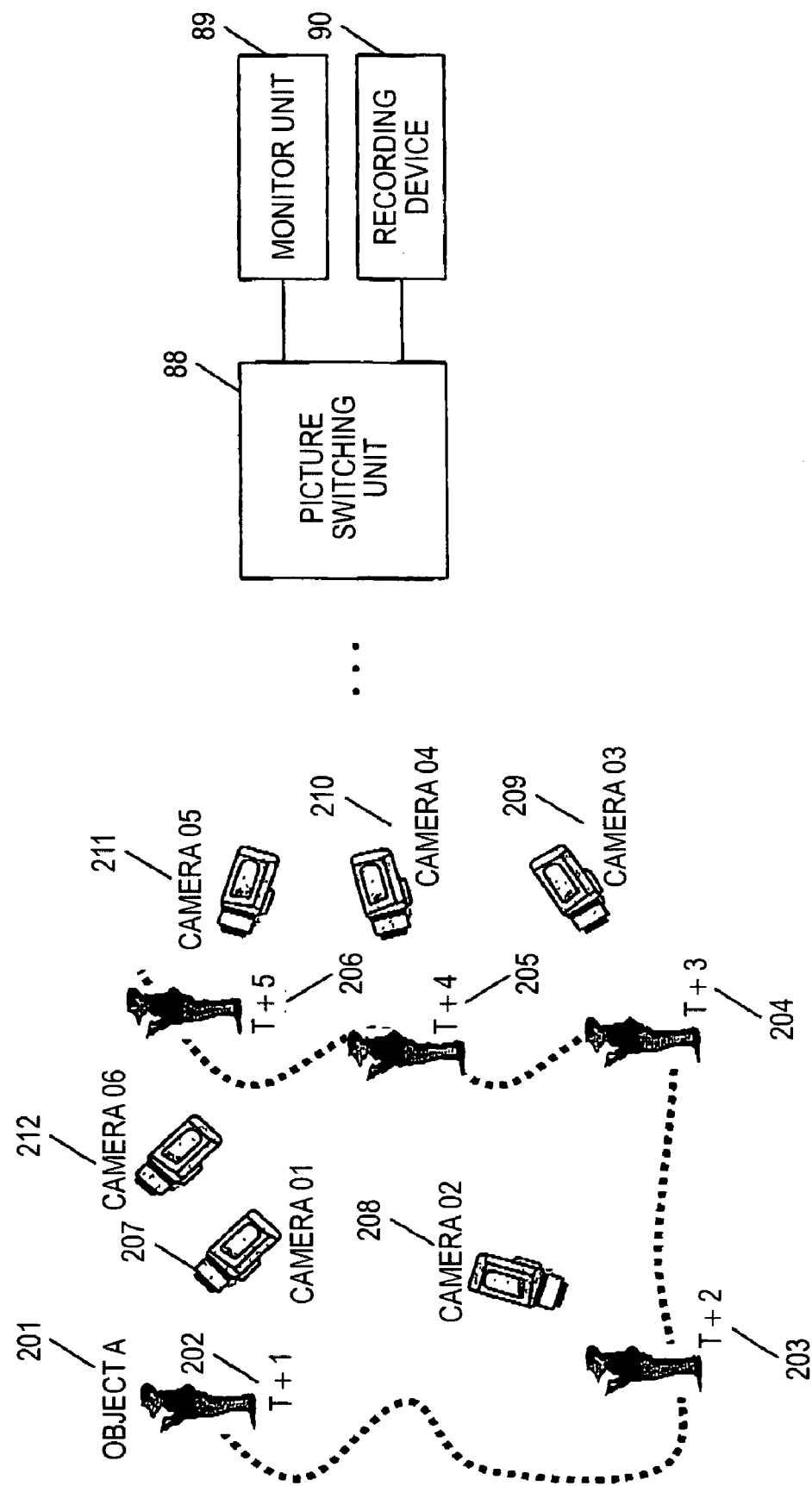
FIG. 20 is an explanatory diagram for explaining the object tracking apparatus according to the fifth embodiment of the present invention.

Referring now to FIGS. 16-18, a description is made of operations of the object tracking apparatus with employment of the above-described arrangements. The object tracking units 84, 85, 86 corresponding to the respective picture input units 81, 82, 83 can acquire tracking information of objects corresponding to the respective picture input units 81, 82, 83. The object tracking units 84, 85, and 86 includes object region acquiring units 91, 97 for acquiring region acquired results of images of objects, object color information acquiring units 93, 99 for acquiring one of the feature properties of the images of the objects, head portion position acquiring units 94, 100 for acquiring the positional information of the images of the objects, time information producing units 95, 101 for acquiring the time information additionally provided with the orbit information of the images of the objects, picture input numbers 96, 102 which are used to identify the respective picture input units 81, 82, 83; and also, three-dimensional positional information acquiring units 92, 98 for converting the positional information of the images of the objects into the three-dimensional positional information. These object tracking units 84, 85, and 86 acquire information related to the images of the respective objects. In order to acquire three-dimensional positional information of an object, calibration processing operations are previously carried out with respect to the respective picture input units 81, 82, 83, so that geometrical positional relationships among inputted pictures are conducted. As indicated in FIG. 18, the calibration units 114, 115, 116 perform calibration process operations in the respective cameras with respect to pictures which are entered from the picture input unit_01_111, the picture input unit_n_113. Both the acquired internal parameter and an external parameter are entered to an intercamera geometrical positional relationship matching unit 117 so as to conduct geometrical positional relationships of the respective input images. Since this process operation is carried out, two-dimensional positional information can be converted into three-dimensional positional information. The resulting three-dimensional positional information constitutes a world coordinate system (namely, coordinate system which does not depend upon coordinate systems of respective input images). The respective information of the images of the objects obtained by the object tracking units 84, 85, 86 is inputted to the plural-camera-to-camera object tracking unit 87, and are verified with each other, and then, a judgement is made as to whether or not the same object is present. In such a case that it is so judged that images of objects which have been moved among the plural cameras are identical to each other, a picture input number of a move destination at this time is outputted to the picture switching unit 88. The picture switching unit 88 into which the picture input number has been inputted switches the present picture to a picture of the received picture input number, and changes the monitor output with respect to the monitor unit 89. Similarly, the picture switching unit 88 switches the picture output to the recording apparatus 90. FIG. 20 illustratively shows a relationship between movement of an object which is extended over input pictures, and monitor pictures acquired at this time. In this drawing, it is so assumed that an object A_201 appears on a camera 01_207 at a time instant T+1_202. It should be understood that a picture output of the camera 01_207 has been communicated to the picture input unit_01_111, and to this end, a camera has been similarly connected to the corresponding picture input unit. At this time, the object A_201 is being displayed on the monitor unit 214 in combination with the picture acquired by the camera 01_207. Thereafter, at a time instant T+2_203, in the case that the object A_201 has been moved from the camera 01_207 to a camera 02_208, the plural-camera-to-camera object tracking unit 87 senses such a fact that the object A_201 has been moved from the camera 01_207 to the camera 02_208, and then, this plural-camera-to-camera object tracking unit 87 outputs the number of the picture input unit_02_112 connected to the camera 02_208 to the picture switching unit 88. Upon receipt of this number, the picture switching unit 88 switches the pictures with respect to both the monitor unit 89 and the recording apparatus 90. Similarly, at a time instant T+3_204, in such a case that the object A_201 has been moved from the camera 02_208 to another camera 03_209, the picture displayed on the monitor unit 89 is switched from the picture of the camera 02_208 to the picture of the camera 03_209. Thereafter, the pictures of the cameras 04_210 and 05_211 are switched in synchronism with the movement of the object A_201.

In accordance with the fourth embodiment of the present invention, in such a case that a series of movement of a specific object is monitored in the system where a plurality of cameras have been installed, the operator no longer switches the pictures in a manual mode in response to the movement of the specific object which is extended over the plural cameras, so that the pictures can be automatically switched in response to the movement of the specific object which is extended over the plural cameras, Also, since the picture switching unit 88 is connected to the recording apparatus 90, only such a picture related to the movement of the specific object can be recorded, and thus, the recording operation related to the specific object can be carried out.

Fifth Embodiment

Figure 19:
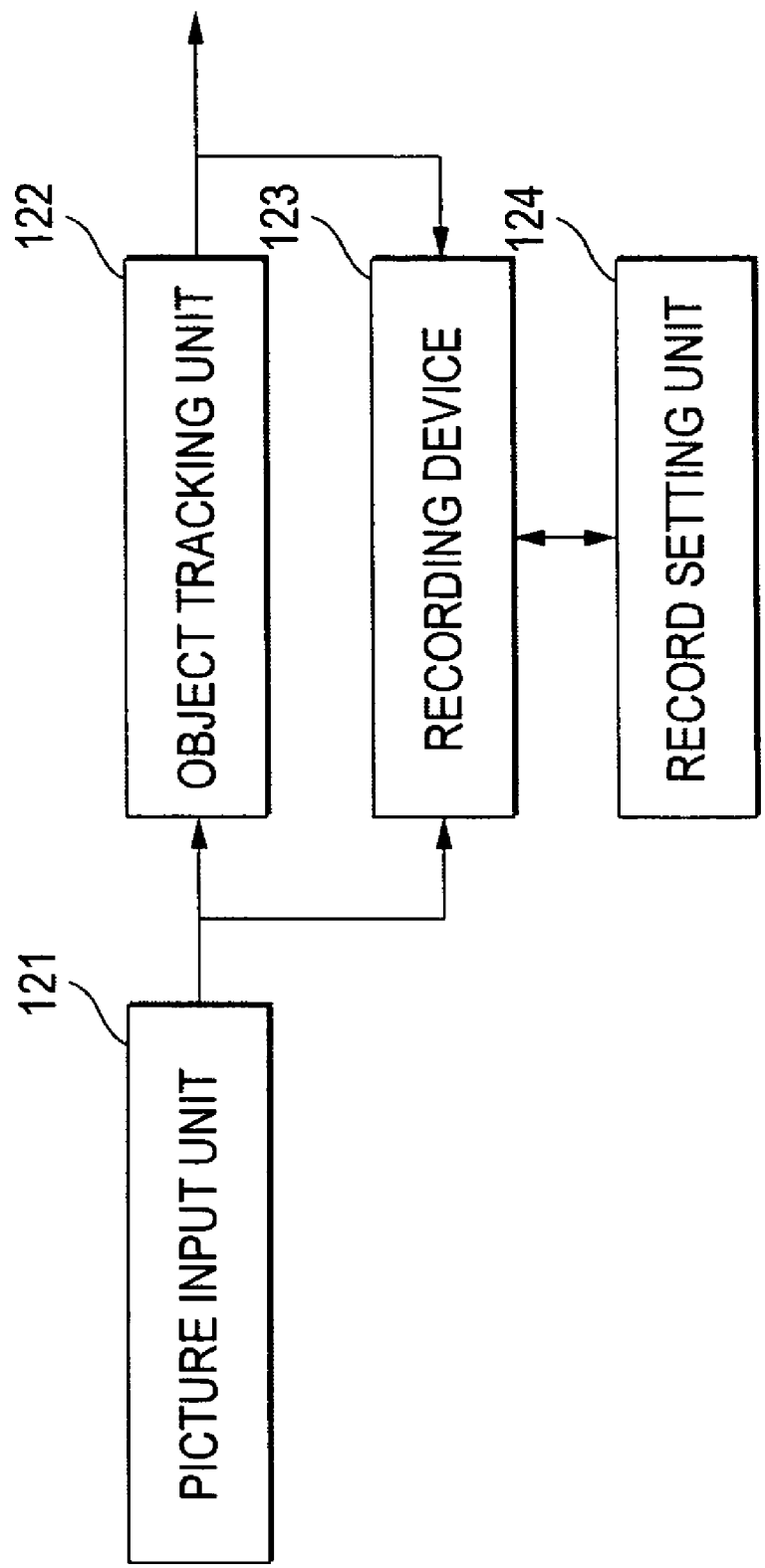
FIG. 19 is an explanatory diagram for explaining the object tracking apparatus according to a fifth embodiment of the present invention.

Next, an object tracking apparatus according to a fifth embodiment of the present invention is shown in FIG. 19. In this drawing, the object tracking apparatus of the fifth embodiment is arranged by employing a picture input unit 121, an object tracking unit 122, a recording device 123, and a record setting unit 124. The picture input unit 122 inputs and stores there into a picture frame which is transmitted from a picture produced from a camera and picture information outputted from a picture storage apparatus. The camera grasps a condition of movement of a person, or monitors an occurrence of an event, and transfers a picture. The object tracking unit 122 tracks images of respective objects with respect to the picture entered from the picture input unit 121, and outputs tracked results of the images of the respective objects every frame of the input image. The recording device 123 performs a recording operation by employing tracking regions of the respective objects outputted from the object tracking unit 122. The record setting unit 124 sets a set value of the recording device 123 to vary recording functions of the recording device 123.

Referring now to FIG. 19 and FIG. 21, operations as to the object tracking apparatus with employment of the above-explained arrangement will be described.

The object tracking unit 122 tracks the images of the respective objects with respect to a picture which is inputted by the picture input unit 121. Then, acquired regional information of the respective objects is inputted to the recording device 123 in combination with the picture inputted by the picture input unit 121 The recording device 123 records the inputted picture in accordance with the set value of the record setting unit 124. This record setting unit 124 may set various sorts of set values; namely, as shown in a case A_216 of FIG. 21, a recording condition is set in a low compression ratio and a high image quality within a region of an object A_218, and a recording condition is set in a high compression ratio and a low image quality with respect to a region other than the region of the object A_218. Further, as shown in a case B_217 of FIG. 21, a recording condition is set in a compression ratio of 30% within a region of an object A_218, and a recording condition is set in a compression ratio of 80% in a region other than the region of the object A_218. Also, such a recording condition is set that a recording operation is carried out within a region, and no recording operation is carried out in any other regions. Also, other than the above-explained setting conditions, when an alarm is entered, setting of a recording operation may be valid. For instance, when an alarm is entered, such a recording condition may be set that only an object region is recorded in a high image quality.

In accordance with the object tracking apparatus of the fifth embodiment of the present invention, since the regional information as to the respective objects is utilized, only the region of the specific object can be recorded while the recording operation of the region except for the region of interest is not carried out. Also, based upon the setting value of the record setting unit 124, as to the region of the specific object, the recording operation is carried out in the low compression ratio and the high resolution, whereas as to the region other than this specific object region, the recording operation is carried out in the high compression ratio and the low resolution.

As previously described, the present invention can provide the method for tracking the target object under such a scene condition that the objects such as persons and vehicles intersects one another, or are hidden by one another, or with respect to the adverse influences caused by the external disturbance noise and the environmental changes. In other words, in the object tracking process operation, the adverse influence caused by the observation noise and the adverse influence caused by the input value having the low reliability are automatically judged, and thus, the use of the input value having the low reliability is reduced, so that the prediction can be carried out in the high reliability. Also, the information as to both the position and the region of the succeeding frame is predicted from the positional and regional information of the preceding frame in addition to the move region in order to track the object, so that the object tracking method having the effect capable of reducing the calculation process amount when the object is tracked can be provided.

What is claimed is:

1. An object tracking method, comprising:
   storing a picture information;
   detecting positional information of an object from the picture information;
   detecting a region of the object in the picture information based on the positional information;
   detecting a feature properties of the object located in the region;
   storing the positional information, the feature properties and the region of the object;
   predicting a position of the object of a next frame in the picture information from the position information;
   determining a predictive area of the next frame where the region is to be moved based on the predicted position of the object of the next frame;
   and verifying the feature properties of the object within the predictive area of the next frame; and
   outputting as an object region, a region of the predictive area that resembles the feature properties most based on the verified result in the verifying process,
   wherein the predicting process includes:
   predicting a first position of the object of the next frame based on the positional information;
   predicting a second position of the object of the next frame based on a position of the object of the previous frame;

selecting one of the predicted first position of the object of the next frame and the predicted second position of the object of the next frame; and outputting the predicted position of the object of the next frame selected in the selecting process.

2. The object tracking method according to claim 1, wherein both the predicting process of the first position and the predicting process of the second position are performed by constituting a dynamic prediction model.

3. The object tracking method according to claim 1, further comprising:

determining a status of a plurality of the objects, wherein the predicted first position of the object of the next frame and the predicted second position of the object of the next frame are selected based on a setting value in the selecting process; and wherein the setting value is determined based on the status of the objects.

4. The object tracking method according to claim 1, further comprising:

applying weight values to the positional information in the past, wherein the positional information with the weight values are used in the predicting process.

5. The object tracking method according to claim 3, further comprising:

determining whether the feature properties of the object in a storage unit is updated based on a result of the status of the objects in the determining process.

6. An object tracking method, comprising:

storing picture information acquired from a capturing unit or outputted from picture storage unit;

tracking individual objects with respect to the picture information and outputs tracked results of the respective objects every frame of the image information;

accumulating tracking times of the respective objects regarding the tracked results of the respective objects;

storing information regarding the tracked results of the respective objects, information regarding the accumulated tracking times, and information regarding the respective objects in a database unit; and retrieving the information stored in the database unit.

7. An object tracking method, comprising: storing a plurality of picture information acquired from a capturing unit or outputted from picture storage unit into a plurality of storing units;

tracking individual objects with respect to the picture information and output tracked results of the respective objects every frame of the image information;

tracking the same object captured among a plurality of the capturing units based on the tracked results of the respective objects;

switching the plurality of picture information of the storing units in accordance with the tracked result of the same object among the capturing units; and recording the picture information switched in the switching process.

8. An object tracking method according to claim 7 further comprising:

previously performing a geometrical calibration of each of the storing units in order to improve tracking precision of the object among the capturing units; and unifying results of the respective geometrical calibrations of the storing units, wherein a positional relationship among the capturing units is employed for tracking the object in a case that an object extended over the capturing units is tracked.

9. An object tracking method, comprising:

storing picture information acquired from a capturing unit or outputted from picture storage unit;

tracking individual objects with respect to the picture information;

outputting tracked results of the respective objects every frame of the image information; and performing a recording operation by using a tracked region of each of the objects outputted in the outputting process; and setting a set value, wherein the recording operation is performed based on the set value.

10. An object tracking apparatus, comprising:

a buffer unit that is configured to store a picture information;

an object position detecting unit that detects positional information of an object from the picture information;

an object region detecting unit that detects a region of the object in the picture information based on the positional information;

a storage unit that detects a feature properties of the object located in the region, and stores the positional information, the feature properties and the region of the object;

a predicting unit that predicts a position of the object of a next frame in the picture information from the positional information;

a determining unit that determines a predictive area of the next frame where the region is to be moved based on the predicted position of the object of the next frame; and a verifying unit that verifies the feature properties of the object within the predictive area of the next frame and outputs as an object region, a region of the predictive area that resembles the feature properties most based on the verified result, wherein a predicting unit includes:

a first predicting unit that predicts a first position of the object of the next frame based on the positional information;

a second predicting unit that predicts a second position of the object of the next frame based on a position of the object of the previous frame;

and a predicted information switching unit that selects one of the predicted first position of the object of the next frame and the predicted second position of the object of the next frame to output the selected predicted position of the object of the next frame in accordance with a setting value.

11. An object tracking apparatus, comprising:

a storing unit that stores picture information acquired from a capturing unit or outputted from picture storage unit;

an object tracking unit that tracks individual objects with respect to the picture information and outputs tracked results of the respective objects every frame of the image information;

a tracking time accumulating unit that accumulates tracking times of the respective objects regarding the tracked results of the respective objects;

a database unit that stores information regarding the tracked results of the respective objects, information regarding the accumulated tracking times, and information regarding the respective objects; and a retrieving unit that retrieves the information stored in the database unit.

12. An object tracking apparatus, comprising:

a plurality of storing units that store a plurality of picture information acquired from a capturing unit or outputted from picture storage unit;

a plurality of object tracking units that track individual objects with respect to the picture information and output tracked results of the respective objects every frame of the image information;

a traversing object tracking unit that tracks the same object captured among a plurality of the capturing units based on the tracked results of the respective objects;

a switching unit that switches the plurality of picture information of the storing units in accordance with the tracked result of the same object among the capturing units; and a recording unit that records the picture information switched by the picture switching unit.

13. The object tracking apparatus according to claim 12, further comprising:

a calibration unit that previously performs a geometrical calibration of each of the storing units in order to improve tracking precision of the object among the capturing units; and an inter-capturing units geometrical positional relationship matching unit that unifies results of the respective geometrical calibrations of the storing units, wherein a positional relationship among the capturing units is employed for tracking the object in a case that an object extended over the capturing units is tracked.

14. An object tracking apparatus, comprising:

a storing unit that stores picture information acquired from a capturing unit or outputted from picture storage unit;

a object tracking unit that track individual objects with respect to the picture information and outputs tracked results of the respective objects every frame of the image information; and a recording unit that performs a recording operation by using a tracked region of each of the objects outputted from the object tracking unit; and a setting unit that sets a set value, wherein the recording unit performs the recording operation based on the set value.

* * * * *